United States Patent
Dalal et al.

(10) Patent No.: US 10,212,092 B2
(45) Date of Patent: Feb. 19, 2019

(54) ARCHITECTURES AND METHODS FOR PROCESSING DATA IN PARALLEL USING OFFLOAD PROCESSING MODULES INSERTABLE INTO SERVERS

(71) Applicant: Xockets, Inc., San Jose, CA (US)

(72) Inventors: Parin Bhadrik Dalal, Milpitas, CA (US); Stephen Paul Belair, Santa Cruz, CA (US)

( * ) Notice: Subject to any disclaimer, the term of this patent is extended or adjusted under 35 U.S.C. 154(b) by 0 days.

(21) Appl. No.: 15/396,330

(22) Filed: Dec. 30, 2016

(65) Prior Publication Data

US 2017/0235699 A1  Aug. 17, 2017

Related U.S. Application Data

(63) Continuation of application No. 13/900,318, filed on May 22, 2013, now Pat. No. 9,558,351.

(Continued)

(51) Int. Cl.
| | |
|---|---|
| *G06F 13/18* | (2006.01) |
| *H04L 12/851* | (2013.01) |
| *G06F 13/16* | (2006.01) |
| *H04L 12/801* | (2013.01) |
| *H04L 29/06* | (2006.01) |

(Continued)

(52) U.S. Cl.
CPC ...... *H04L 47/2441* (2013.01); *G06F 13/1605* (2013.01); *G06F 13/1652* (2013.01); *G06F 13/1673* (2013.01); *G06F 13/28* (2013.01); *G06F 13/364* (2013.01); *G06F 13/404* (2013.01); *G06F 13/4022* (2013.01); *G06F 13/4234* (2013.01); *G06F 21/55* (2013.01); *H04L 29/06* (2013.01); *H04L 47/10* (2013.01); *H04L 49/70* (2013.01); *H04L 63/0227* (2013.01); *Y02D 10/14* (2018.01); *Y02D 10/151* (2018.01)

(58) Field of Classification Search
CPC ....... G06F 3/067; G06F 13/00; G06F 11/2033
USPC .................. 710/300–306, 308, 100, 316–317
See application file for complete search history.

(56) References Cited

U.S. PATENT DOCUMENTS

| | | |
|---|---|---|
| 4,894,768 A | 1/1990 | Iwasaki et al. |
| 6,157,955 A | 12/2000 | Narad et al. |

(Continued)

OTHER PUBLICATIONS

WIPO, Written Opinion of the International Searching Authority for PCT Application PCT/US2015/023746, dated Sep. 15, 2015.

(Continued)

*Primary Examiner* — Tim T Vo
*Assistant Examiner* — Kim T Huynh

(57) ABSTRACT

A distributed computing architecture for executing at least first and second computing operations executed in parallel on a set of data, can include a plurality of servers, including first servers that each include at least one central processing unit (CPU), and at least one offload processing module coupled to CPU by a bus. Each offload processing module can include computation elements. The computation elements can be configured to operate as a virtual switch, and to execute the second computing operations on first processed data to generate second processed data. The virtual switches can form a switch fabric for exchanging data between the offload processing modules. The second computing operations are executed on a plurality of the offload processing modules in parallel.

20 Claims, 11 Drawing Sheets

Related U.S. Application Data

(60) Provisional application No. 61/650,373, filed on May 22, 2012, provisional application No. 61/753,892, filed on Jan. 17, 2013, provisional application No. 61/753,895, filed on Jan. 17, 2013, provisional application No. 61/753,899, filed on Jan. 17, 2013, provisional application No. 61/753,901, filed on Jan. 17, 2013, provisional application No. 61/753,903, filed on Jan. 17, 2013, provisional application No. 61/753,904, filed on Jan. 17, 2013, provisional application No. 61/753,906, filed on Jan. 17, 2013, provisional application No. 61/753,907, filed on Jan. 17, 2013, provisional application No. 61/753,910, filed on Jan. 17, 2013.

(51) Int. Cl.
| | |
|---|---|
| G06F 13/28 | (2006.01) |
| G06F 21/55 | (2013.01) |
| H04L 12/931 | (2013.01) |
| G06F 13/364 | (2006.01) |
| G06F 13/40 | (2006.01) |
| G06F 13/42 | (2006.01) |

(56) References Cited

U.S. PATENT DOCUMENTS

| | | |
|---|---|---|
| 6,446,163 B1 | 9/2002 | Hazelzet et al. |
| 7,436,845 B1 | 10/2008 | Rygh et al. |
| 8,072,887 B1 | 12/2011 | Siva et al. |
| 8,149,834 B1 | 4/2012 | Nielsen et al. |
| 8,635,417 B2 | 1/2014 | Morrison et al. |
| 8,825,900 B1 | 9/2014 | Gross, IV et al. |
| 8,885,334 B1* | 11/2014 | Baxter ............... G06F 13/1684 361/679.32 |
| 8,924,606 B2 | 12/2014 | Akiyama et al. |
| 8,990,799 B1 | 3/2015 | Forecast |
| 9,250,954 B2 | 2/2016 | Dalal et al. |
| 9,258,276 B2 | 2/2016 | Dalal |
| 9,286,472 B2 | 3/2016 | Dalal et al. |
| 9,288,101 B1 | 3/2016 | Dalal et al. |
| 9,348,638 B2 | 5/2016 | Dalal et al. |
| 9,378,161 B1 | 6/2016 | Dalal et al. |
| 9,436,638 B1 | 9/2016 | Dalal et al. |
| 9,436,639 B1 | 9/2016 | Dalal et al. |
| 9,436,640 B1 | 9/2016 | Dalal et al. |
| 9,460,031 B1 | 10/2016 | Dalal et al. |
| 9,495,308 B2 | 11/2016 | Dalal |
| 9,558,351 B2 | 1/2017 | Dalal et al. |
| 9,619,406 B2 | 4/2017 | Dalal |
| 9,665,503 B2 | 5/2017 | Dalal |
| 2004/0024915 A1 | 2/2004 | Abe |
| 2004/0133720 A1 | 7/2004 | Slupsky |
| 2004/0187122 A1 | 9/2004 | Gosalia et al. |
| 2004/0202319 A1 | 10/2004 | Hussain et al. |
| 2005/0038946 A1 | 2/2005 | Borden |
| 2005/0226238 A1 | 10/2005 | Hoskote et al. |
| 2007/0016906 A1 | 1/2007 | Trauben et al. |
| 2007/0079185 A1 | 4/2007 | Tololos, Jr. |
| 2007/0097130 A1 | 5/2007 | Margulis |
| 2007/0115983 A1 | 5/2007 | Yadlon et al. |
| 2007/0294433 A1 | 12/2007 | Leigh |
| 2008/0027920 A1 | 1/2008 | Schipunov et al. |
| 2008/0304481 A1 | 12/2008 | Gurney et al. |
| 2009/0254719 A1 | 10/2009 | Sasage |
| 2010/0031235 A1 | 2/2010 | Adams et al. |
| 2010/0232548 A1 | 9/2010 | Bolan et al. |
| 2010/0235484 A1* | 9/2010 | Bolan ............... G05B 23/0267 709/223 |
| 2010/0312913 A1 | 12/2010 | Wittenschaleger |
| 2011/0035540 A1 | 2/2011 | Fitzgerald et al. |
| 2011/0099317 A1 | 4/2011 | Nishtala et al. |
| 2011/0103259 A1 | 5/2011 | Aybay et al. |
| 2012/0047126 A1 | 2/2012 | Branscome et al. |
| 2012/0076006 A1 | 3/2012 | DeCusatis |
| 2012/0096211 A1* | 4/2012 | Davis ................... H04L 49/101 710/314 |
| 2012/0131306 A1 | 5/2012 | Bratt et al. |
| 2012/0250682 A1 | 10/2012 | Vincent et al. |
| 2013/0031390 A1 | 1/2013 | Smith, III et al. |
| 2013/0179435 A1 | 6/2013 | Stadter |
| 2013/0219168 A1 | 8/2013 | Gearhart et al. |
| 2013/0290462 A1 | 10/2013 | Lim et al. |
| 2013/0347110 A1* | 12/2013 | Dalal ..................... G06F 13/16 726/23 |
| 2014/0115282 A1 | 4/2014 | Natkovich et al. |
| 2014/0157287 A1 | 6/2014 | Howes et al. |
| 2014/0181319 A1 | 6/2014 | Chen et al. |
| 2014/0204099 A1 | 6/2014 | Ye |
| 2014/0201314 A1 | 7/2014 | Borkenhagen |
| 2016/0306667 A1 | 10/2016 | Burger et al. |

OTHER PUBLICATIONS

WIPO, International Search Report for PCT Application PCT/US2015/023746, dated Sep. 15, 2015.

WIPO, Written Opinion of the International Searching Authority for PCT Application PCT/US2015/023730, dated Jul. 23, 2015.

WIPO, International Search Report for PCT Application PCT/US2015/023730, dated Jul. 23, 2015.

Miyashiro et al., DIMMNET-2: A Reconfigurable Board Connected to a Memory Slot, International Conference on Field Programmable Logic and Applications, 2006, Aug. 28-30, 2006, Madrid, Spain.

Tanabe et al., Preliminary Evaluations of a FPGA-based-Prototype of DIMMnet-2 Network Interface, Proceedings of the Innovative Architecture for Future Generation High-Performance Processors and Systems (IWIA '05), 2005.

Plessl et al., TKDM—A Reconfigurable Co-processor in a PC's Memory Slot, IEEE International Conference on Field-Programmable Technology (FPT), 2003, Dec. 17, 2003, Tokyo, Japan.

Tanabe et al., Prototyping on Using a DIMM Slot as a High-Performance I/O Interface, Proceedings of the Innovative Architecture for Future Generation High-Performance Processors and Systems (IWIA '03), 2003.

Tong et al., A System Level Implementation of Rijndael on a Memory-slot based FPGA Card, IEEE International Conference on Field-Programmable Technology (FPT), 2002, Dec. 16-18, 2002, Hong Kong, China.

Leong et al., Pilchard—A Reconfigurable Computing Platform with Memory Slot Interface, Proceedings of the 9th Annual IEEE Symposium on Field-Programmable Custom Computing Machines (FCCM '01), 2001.

* cited by examiner

| Systems | x86 | ARM | DIMMs | NICs |
|---|---|---|---|---|
| Xockets MAX 1U | 2x Opteron 4256 EE, 1.8GhZ/8MB | 80x A9, 800MHz, 1MB | 8 x 8GB | 4 x 40 Gbps |
| Xockets MIN 1U | 2x Opteron 4256 EE, 1.8GhZ/8MB | 20x A9, 800MHz, 1MB | 14 x 8GB | 2 x 10 Gbps |
| Reference 1U | 2x Xeon E31280, 3.3GhZ/8MB | | 18 x 8GB | 2 x 10 Gbps |
| Xockets MAX 2U | 4x Opteron 4256 EE, 1.8GhZ/8MB | 160x A9, 800MHz, 1MB | 16 x 8GB | 4 x 80 Gbps |
| Reference 2U | 4x Xeon E31280, 3.3GhZ/8MB | | 32 x 8GB | 4 x 20 Gbps |

FIG. 4-3

| Component | Av. Power (W) | Max. Power (W) | Qty. | Av. Total (W) | Total (W) |
|---|---|---|---|---|---|
| RLDRAM3, 667 MHz 576MB | 0.7 | 1.2 | 4 | 2.8 | 4.8 |
| Zynq 7020 800 MHz | 1.5 | 2.5 | 4 | 6 | 10 |
| Zynq 7020 800 MHz (arb) | 1.3 | 2.1 | 1 | 1.3 | 2.1 |
| Inphi iMB2 | 0.8 | 1.2 | 1 | 0.8 | 2.9 |
| Other | | | | 2.9 | 2.1 |
| Total Power Budget at maximum 24 Gbps ingress and 24 Gbps egress per DIMM | | | | 13.8 | 21 |

FIG. 4-4

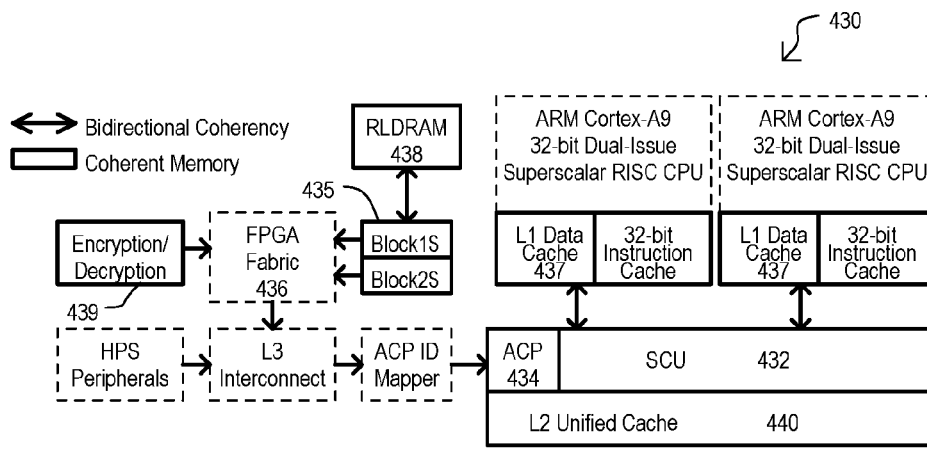

FIG. 4-5

ARCHITECTURES AND METHODS FOR PROCESSING DATA IN PARALLEL USING OFFLOAD PROCESSING MODULES INSERTABLE INTO SERVERS

PRIORITY CLAIMS

This application is a continuation of U.S. patent application Ser. No. 13/900,318 filed May 22, 2013 which claims the benefit of U.S. Provisional Patent Applications 61/650,373 filed May 22, 2012, 61/753,892 filed on Jan. 17, 2013, 61/753,895 filed on Jan. 17, 2013, 61/753,899 filed on Jan. 17, 2013, 61/753,901 filed on Jan. 17, 2013, 61/753,903 filed on Jan. 17, 2013, 61/753,904 filed on Jan. 17, 2013, 61/753,906 filed on Jan. 17, 2013, 61/753,907 filed on Jan. 17, 2013, and 61/753,910 filed on Jan. 17, 2013, the contents all of which are incorporated by reference herein.

TECHNICAL FIELD

The present disclosure relates generally to server architectures for processing data in parallel, such as unstructured data, and more particularly to server architectures that employ offload or auxiliary processing modules to execute intermediate processing steps of a data processing framework, while server central processors (CPU) execute other processing steps of the same framework.

BACKGROUND

Enterprises store and process their large amounts of data in a variety of ways. One manner in which enterprises store data is by using relational databases and corresponding relational database management systems (RDBMS). Such data, usually referred to as structured data, may be collected, normalized, formatted and stored in an RDBMS. Tools based on standardized data languages such as the Structured Query Language (SQL) may be used for accessing and processing structured data. However, it is estimated that such formatted structured data represents only a tiny fraction of an enterprise's stored data. Organizations are becoming increasingly aware that substantial information and knowledge resides in unstructured data (i.e., "Big Data") repositories. Accordingly, simple and effective access to both structured and unstructured data are seen as necessary for maximizing the value of enterprise informational resources.

However, conventional platforms that are currently being used to handle structured and unstructured data can substantially differ in their architecture. In-memory processing and Storage Area Network (SAN)-like architectures are used for traditional SQL queries, while commodity or shared nothing architectures (each computing node, consisting of a processor, local memory, and disk resources, shares nothing with other nodes in the computing cluster) are usually used for processing unstructured data. An architecture that supports both structured and unstructured queries can better handle current and emerging Big Data applications.

SUMMARY

A structured data processing system can include a plurality of XIMM modules connected to a memory bus in a first server, with the XIMM modules each respectively having a DMA slave module connected to the memory bus and an arbiter for scheduling tasks, with the XIMM modules providing an in-memory database; and a central processing unit (CPU) in the first server connected to the XIMM modules by the memory bus, with the CPU arranged to process and direct structured queries to the plurality of XIMM modules.

BRIEF DESCRIPTION OF THE DRAWINGS

FIGS. 2-1 and 2-2 are diagrams showing the workflow and distributed architecture used to implement a data processing software.

FIG. 3-1 is flow diagram showing a data processing method according to an embodiment.

FIG. 3-2 shows a data processing architecture according to an embodiment.

FIG. 4-1 shows a cartoon schematically illustrating a data processing system according to an embodiment, including a removable computation module for offload of data processing.

FIG. 4-2 shows an example layout of an in-line module (referred to as a "XIMM") module according to an embodiment.

FIG. 4-3 shows two possible architectures for a XIMM in a simulation (Xockets MAX and MIN).

FIG. 4-4 shows a representative the power budget for a XIMMs according to various embodiments.

FIG. 4-5 illustrates data flow operations of one embodiment using an ARM A9 architecture.

FIG. 5-1 is a block schematic diagram of a processing module according to an embodiment.

FIGS. 5-2 and 5-3 are diagrams of a processor module according to embodiments.

FIG. 5-4 is a diagram showing an opposing side of a processor module like that of FIG. 5-2 or 5-3, according to an embodiment.

FIG. 5-5 is a diagram of a system according to an embodiment.

FIGS. 5-6 to 5-11 are block schematic diagrams showing processor module operations according to particular embodiments.

FIG. 5-12 is a flow diagram of a method according to an embodiment.

FIG. 5-13 is a flow diagram of a method according to another embodiment.

FIG. 6-1 is a block schematic diagram of a system according to another embodiment.

FIG. 6-2 is a diagram showing a system flow according to an embodiment.

DETAILED DESCRIPTION

Data processing and analytics for enterprise server or cloud based data systems, including both structured or unstructured data, can be efficiently implemented on offload processing modules connected to a memory bus, for example, by insertion into a socket for a Dual In-line Memory Module (DIMM). Such modules can be referred to as Xocket™ In-line Memory Modules (XIMMs), and can have multiple "wimpy" cores associated with a memory channel. Using one or more XIMMs it is possible to execute lightweight data processing tasks without intervention from a main server processor. As will be discussed, XIMM modules have high efficiency context switching, high parallelism, and can efficiently process large data sets. Such systems as a whole are able to handle large database searches at a very low power when compared to traditional high power "brawny" server cores. Advantageously, by accelerating implementation of MapReduce or similar algorithms on unstructured data and by providing high performance virtual shared disk for structured queries, a XIMM based architecture capable of partitioning tasks is able to greatly improve data analytic performance.

Figure 1:
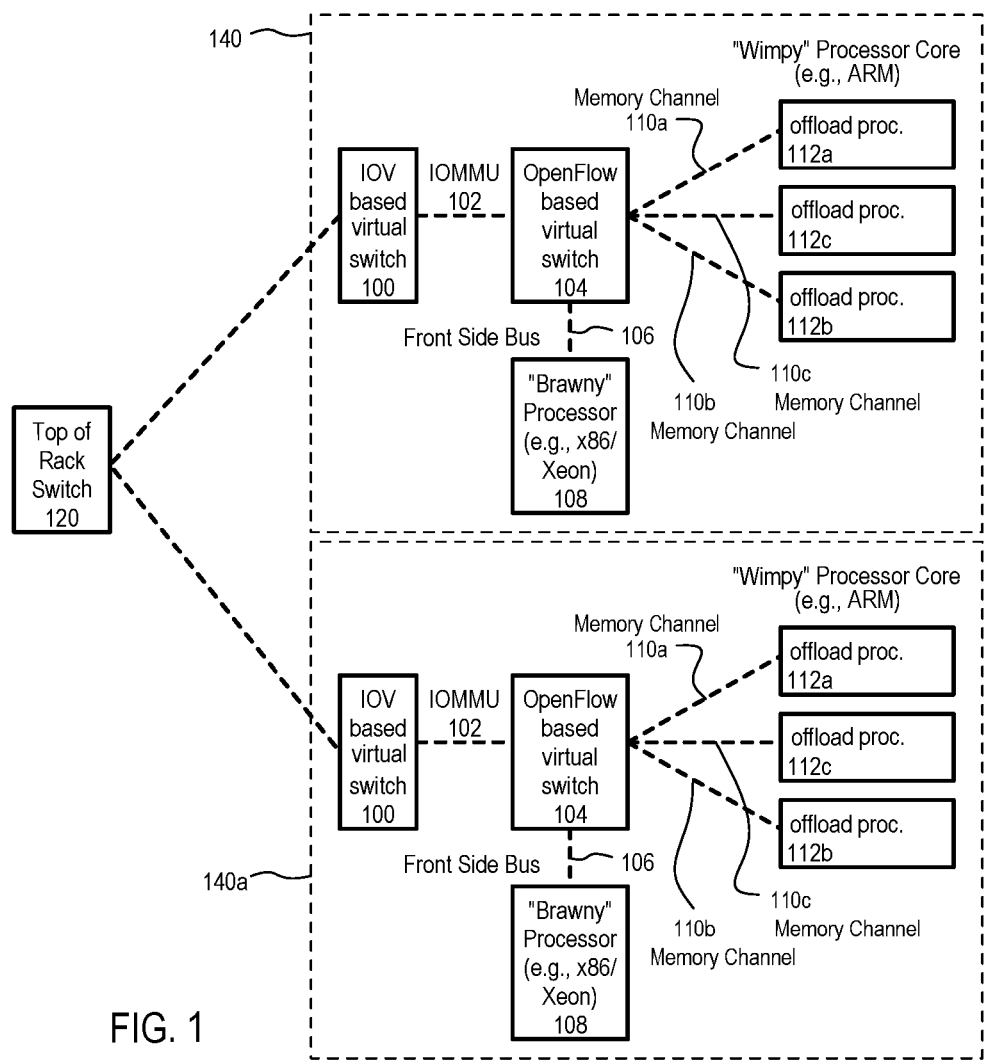
FIG. 1 shows illustrates an embodiment suitable to process structured queries.

FIG. 1 illustrates an embodiment to process structured queries according to an embodiment. FIG. 1 depicts two commodity computers which can be rack servers (140, 140a), each of which includes at least one central processing unit (108) and a set of offload processors (112a to 112c). The servers (140, 140a) are preferably present in the same rack and connected by a top of rack (TOR) switch (120). The servers (140, 140a) are suited for hosting a distributed and shared in-memory assembly (110a, 110b) that can handle and respond to structured queries as one large in-memory system.

Traditionally, an in-memory database that handles structured queries looks for the query in its physical memory, and in the absence of the query therein will perform a disk read to a database. The disk read might result in the page cache of the kernel being populated with the disk file. The process might perform a complete copy of the page(s) (in a paged memory system) into its process buffer or it might perform a mmap operation, wherein a pointer to the entry in the page cache storing the pages is created and stored in the heap of the process. The latter is less time consuming and more efficient than the former.

The inclusion of a XIMM supported data retrieval framework can effectively extend the overall available size of the in-memory space available with the assembly. In case a structured query is being handled by one of the said CPUs (108), and the CPU is unable to retrieve it from its main memory, it will immediately trap into a memory map (mmap routine) that will handle disk reads and populate the page cache.

The embodiment described herein can modify the mmap routine of standard operating systems to execute code corresponding to a driver for a removable computation module driver, in this case a XIMM driver. The XIMM driver in turn identifies the query and transfers the query to one or more XIMMs in the form of memory reads/writes. A XIMM can house a plurality of offload processors (112a to 112c) that can receive the memory read/write commands containing the structured query. One or more of the offload processors (112a to 112c) can perform a search for the query in its available cache and local memory and return the result. According to embodiments, an mmap query can further be modified to allow the transference of the query to XIMMs that are not in the same server but in the same rack. The mmap abstraction in such a case can perform a remote direct memory access (RDMA) or a similar network memory read for accessing data present in a XIMM that is in the same rack. As a second XIMM (i.e., offload processors 112a to 112c of server 140a) is connected to a first XIMM (i.e., offload processors 112a to 112c of server 140) through a top of rack switch 120, the latency of a system according to an embodiment can be the combined latency of the network interface cards (NICs) of the two servers (i.e., 100 in 140 and 100 in 140a), the latency of the TOR switch 120, and a response time of the second XIMM.

Despite the additional hops, embodiments can provide a system that can have a much lower latency than a read from a hard disk drive. The described architecture can provide orders of magnitude improvement over a single structured query in-memory database. By allowing for non-frequently used data of one of the servers to be pushed to another XIMM located in the same rack, the effective in-memory space can be increased beyond conventional limits, and a large assembly having a large physical, low latency memory space can be created. This embodiment may further be improved by allowing for transparent sharing of pages across multiple XIMMs. Embodiments can further improve the latency between server-to-server connections by mediating them by XIMMs. The XIMMs can act as intelligent switches to offload and bypass the TOR switch.

Conventional data intensive computing platforms for handling large volumes of unstructured data can use a parallel computing approach combining multiple processors and disks in large commodity computing clusters connected with high-speed communications switches and networks. This can allow the data to be partitioned among the available computing resources and processed independently to achieve performance and scalability based on the amount of data. A variety of distributed architectures have been developed for data-intensive computing and several software frameworks have been proposed to process unstructured data. One such programming model for processing large data sets with a parallel, distributed algorithm on a multiple servers or clusters is commonly known as MapReduce. Hadoop is a popular open-source implementation of MapReduce that is widely used by enterprises for search of unstructured data.

Figures 1, 2:
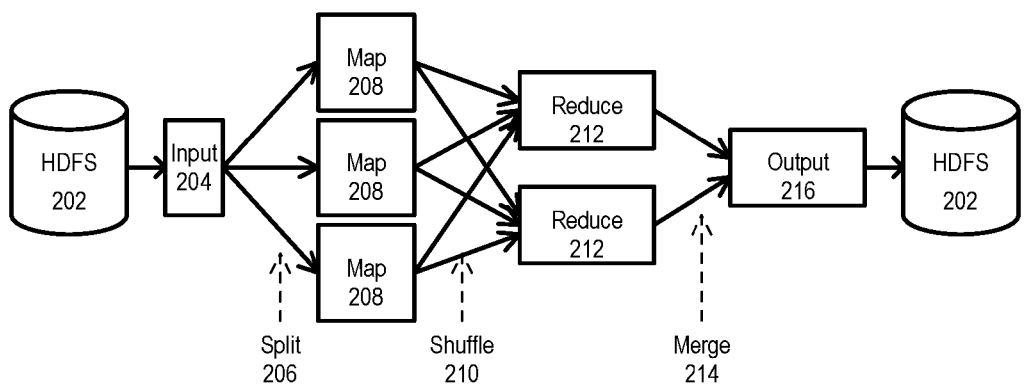
Figure 2:
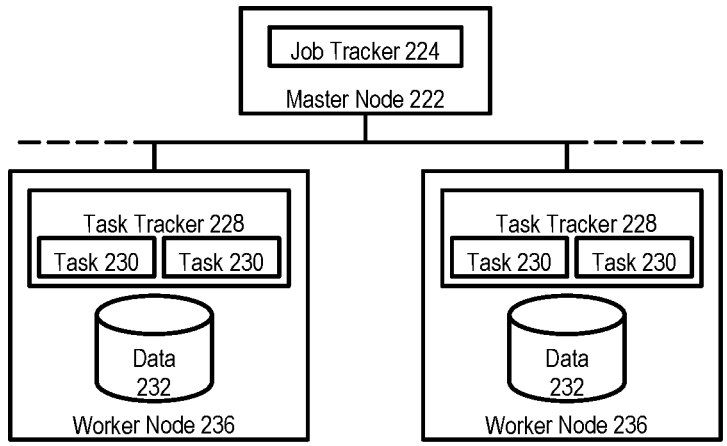

FIGS. 2-1 and 2-2 show the workflow and distributed architecture used to implement a data processing software, such as Hadoop. Referring to FIG. 2-1, Hadoop MapReduce workloads may be broken into Split, Map, Shuffle, Reduce and Merge phases. The input file (204) is fetched from a file system such as Hadoop Distributed File System (HDFS) (202) and divided into smaller pieces referred to as Splits. Each Split (206) is a contiguous range of the input. Each record in each input split is independently passed to a Map function run by a Mapper (208) hosted on a processor. The Map function accepts a single record as an input and produces zero or more output records, each of which contains a key and a value. In the Shuffle phase (210), the results from the Map functions, referred to as intermediate (key, value) pairs, are rearranged such that all values with the same key are grouped together. The Reduce function run by a Reducer (212) takes in a key value and a list values as the input and produces another list as the output. The output records from Reduce functions are merged to form an Output file (216) which is then stored in the file system (202).

Map and Reduce tasks are computationally intensive and have very tight dependency on each other. While Map tasks are small and independent tasks that can run in parallel, the Reduce tasks include fetching intermediate (key, value) pairs that result from each Map function, sorting and merging intermediate results according to keys and applying Reduce functions to the sorted intermediate results. Reducer (212) can perform the Reduce function only after it receives the intermediate results from all the Mappers (208). Thus, the Shuffle step (210) (communicating the Map results to Reducers) often becomes the bottleneck in Hadoop workloads and introduces latency.

FIG. 2-2 shows a typical computing cluster used to implement Hadoop. A Master Node (222) runs a JobTracker (224) which organizes the cluster's activities. Each of the Worker Nodes (326) run a TaskTracker (228) which organizes the worker node's activities. All input jobs are organized into sequential tiers of tasks (230). The tasks could be map tasks or reduce tasks. The TaskTracker (228) runs a number of map and reduce tasks concurrently and pulls new tasks from the JobTracker (224) as soon as the old tasks are completed. The Hadoop Map-Reduce layer stores intermediate data (232) produced by the map and reduce tasks in the Hadoop Distributed File System (202) discussed in FIG. 2-1. HDFS (202) is designed to provide high streaming throughput to large, write-once-read-many-times files.

In an embodiment, a XIMM based architecture can improve Hadoop (or similar data processing) performance in two ways. Firstly, intrinsically parallel computational tasks can be allocated to the XIMMs (e.g., modules with offload processors), leaving the number crunching tasks to "brawny" (e.g., x86) cores. This is illustrated in more detail in FIG. 3-1.

Figures 1, 3:
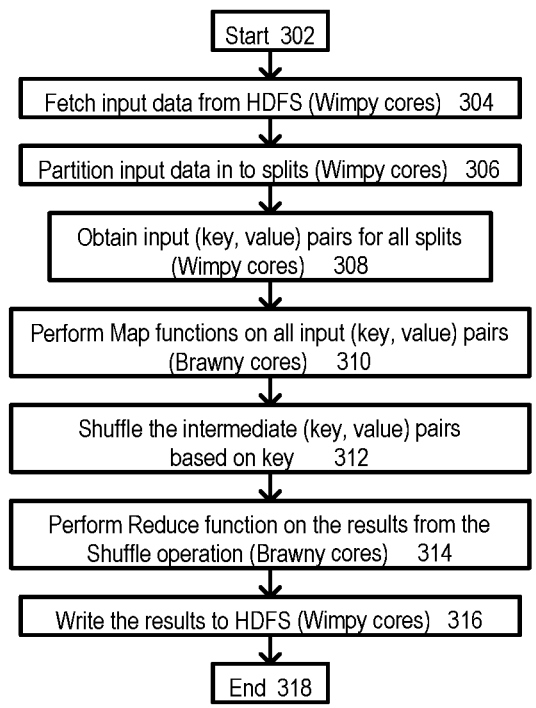
Figures 2, 3:
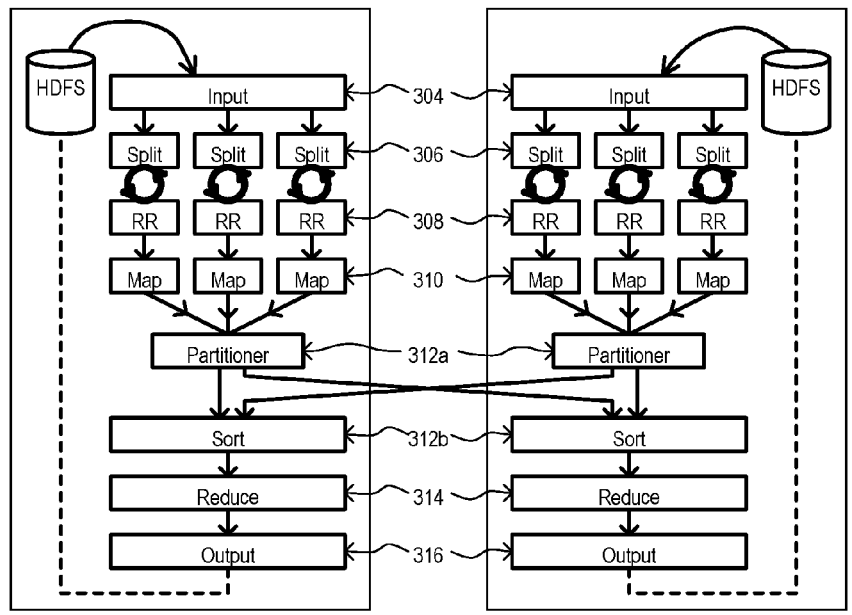

FIG. 3-1 is flow diagram showing a data processing method according to an embodiment. A method can start (302) and input data can be fetched from a file system (304). In particular embodiments this can include a Direct Memory Access (DMA) operation from an HDFS. In some embodiments, all DMA operations are engineered such that all the parallel Map steps are equitably served with data. The input data can be partitioned into splits in (306) and parsed into records that contain initial (key, value) pairs in (308). Since the tasks involved in steps (304, 306 and 308) are computationally light, they can be performed all, or in part, by the offload processors hosted on the XIMMs (e.g., by wimpy cores). Map operations can then be performed on the initial (key, value) pairs (310). The intermediate (key, value) pairs that result from the Map operations can then be communicated to the Reducers (312). Once the results from all the Map operations are available, Reduce operations can be performed (314). The results from the Reducers are merged into a single output file and written back to the file system (e.g., 302) by offload processors (316). Since Map and Reduce functions are computationally intensive, the steps (310 and 314) can be handled by a CPU (e.g., by brawny cores). Such distribution of workloads to processor cores that are favorably disposed to perform them can reduce latency and/or increases efficiency.

A XIMM based architecture, according to an embodiment, can reduce the intrinsic bottleneck of most Hadoop (or similar data processing) workloads (the Shuffle phase) by driving the I/O backplane to its full capacity. In a conventional Hadoop system, the TaskTracker (228) described in FIG. 2-2 serves hyper-text transport protocol (HTTP) GET requests to communicate Map results to Reduce inputs. Also, the Mappers and Reducers hosted by the individual server CPUs have to communicate using their corresponding top of rack (TOR) switches of the corresponding racks. This slows down the process. Further, the Reducers hosted by the CPU stay idle while the results from Map operations are collected and sorted, introducing further computational inefficiency.

FIG. 3-2 shows a data processing architecture according to an embodiment. In the architecture illustrated in FIG. 3-2, operational modules are labeled to reflect their primary operations as previously noted with respect to FIG. 3-1. In an embodiment, instead of using HTTP to communicate, a publish-subscribe model is used to perform the Shuffling phase as shown in FIG. 3-2. Since the results from the Map step (310) are already stored and available in main memory, they can be collected through DMA operations (312a) and parsed (312b) by XIMMs. Since Map results are not required to be written to disk, latency can be reduced. Further, the XIMMs incorporated into the individual servers can define a switch fabric that can be used for Shuffling. The mid-plane defined by the XIMM based switch fabric is capable of driving and receiving the full 240 Gbps capacity of the PCI-3.0 bus and thus offers better speed and bandwidth compared to HTTP. The key is published through the massively parallel I/O mid-plane defined by the XIMMs (312a). Subscriptions are identified based on the keys and are directed to the Reducers hosted on the CPU through virtual interrupts (312b). Thus, rack-level locality and aggregation that are typical of conventional Hadoop systems are no longer required in the XIMM based architecture. Instead, intermediate (key, value) pairs are exchanged by all the computing nodes across several different servers through intelligent virtual switching of the XIMMs resulting in efficient processing of Hadoop workloads.

The following example(s) provide illustration and discussion of exemplary hardware and data processing systems suitable for implementation and operation of the foregoing discussed systems and methods. In particular hardware and operation of wimpy cores or computational elements connected to a memory bus and mounted in DIMM or other conventional memory socket is discussed.

Figures 1, 4:
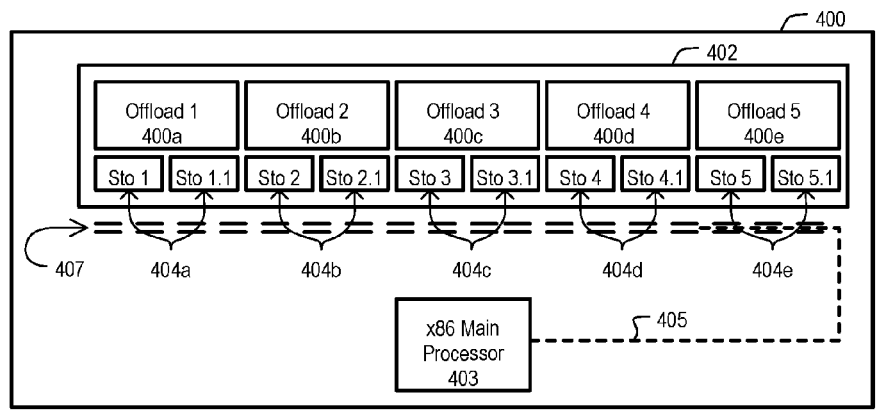
Figures 2, 4:
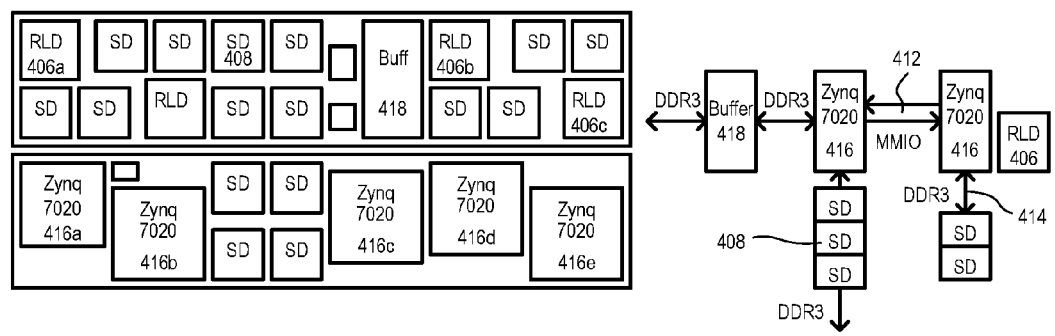

FIG. 4-1 is a cartoon schematically illustrating a data processing system 400 including a removable computation module 402 for offload of data processing from x86 or similar main/server processors 403 to modules connected to a memory bus 403. Such modules 402 can be XIMM modules, as described herein or equivalents, and can have multiple computation elements that can be referred to as "offload processors" because they offload various "light touch" processing tasks such HTML, video, packet level services, security, or data analytics. This is of particular advantage for applications that require frequent random access or application context switching, since many server processors incur significant power usage or have data throughput limitations that can be greatly reduced by transfer of the computation to lower power and more memory efficient offload processors.

The computation elements or offload processors can be accessible through memory bus 405. In this embodiment, the module can be inserted into a Dual Inline Memory Module (DIMM) slot on a commodity computer or server using a DIMM connector (407), providing a significant increase in effective computing power to system 400. The module (e.g., XIMM) may communicate with other components in the commodity computer or server via one of a variety of busses including but not limited to any version of existing double data rate standards (e.g., DDR, DDR2, DDR3, etc.)

This illustrated embodiment of the module 402 contains five offload processors (400a, 400b, 400c, 400d, 400e) however other embodiments containing greater or fewer numbers of processors are contemplated. The offload processors (400a to 400e) can be custom manufactured or one of a variety of commodity processors including but not limited to field-programmable grid arrays (FPGA), microprocessors, reduced instruction set computers (RISC), microcontrollers or ARM processors. The computation elements or offload processors can include combinations of computational FPGAs such as those based on Altera, Xilinx (e.g., Artix™ class or Zynq® architecture, e.g., Zynq® 7020), and/or conventional processors such as those based on Intel Atom or ARM architecture (e.g., ARM A9). For many applications, ARM processors having advanced memory handling features such as a snoop control unit (SCU) are preferred, since this can allow coherent read and write of memory. Other preferred advanced memory features can include processors that support an accelerator coherency port (ACP) that can allow for coherent supplementation of the cache through an FPGA fabric or computational element.

Each offload processor (400a to 400e) on the module 402 may run one of a variety of operating systems including but not limited to Apache or Linux. In addition, the offload processors (400a to 400e) may have access to a plurality of dedicated or shared storage methods. In this embodiment, each offload processor can connect to one or more storage units (in this embodiments, pairs of storage units 404a, 404b, 404c, 404d and 404e). Storage units (404a to 404e) can be of a variety of storage types, including but not limited to random access memory (RAM), dynamic random access memory (DRAM), sequential access memory (SAM), static random access memory (SRAM), synchronous dynamic random access memory (SDRAM), reduced latency dynamic random access memory (RLDRAM), flash memory, or other emerging memory standards such as those based on DDR4 or hybrid memory cubes (HMC).

FIG. 4-2 shows an example layout of a module (e.g., XIMM) such as that described in FIG. 4-1, as well as a connectivity diagram between the components of the module. In this example, five Xilinx™ Zynq® 7020 (416a, 416b, 416c, 416d, 416e and 416 in the connectivity diagram) programmable systems-on-a-chip (SoC) are used as computational FPGAs/offload processors. These offload processors can communicate with each other using memory-mapped input-output (MMIO) (412). The types of storage units used in this example are SDRAM (SD, one shown as 408) and RLDRAM (RLD, three shown as 406a, 406b, 406c) and an Inphi™ iMB02 memory buffer 418. Down conversion of 3.3 V to 2.5 volt is required to connect the RLDRAM (406a to 406c) with the Zynq® components. The components are connected to the offload processors and to each other via a DDR3 (414) memory bus. Advantageously, the indicated layout maximizes memory resources availability without requiring a violation of the number of pins available under the DIMM standard.

In this embodiment, one of the Zynq® computational FPGAs (416a to 416e) can act as arbiter providing a memory cache, giving an ability to have peer to peer sharing of data (via memcached or OMQ memory formalisms) between the other Zynq® computational FPGAs (416a to 416e). Traffic departing for the computational FPGAs can be controlled through memory mapped I/O. The arbiter queues session data for use, and when a computational FPGA asks for address outside of the provided session, the arbiter can be the first level of retrieval, external processing determination, and predictors set.

FIG. 4-3 shows two possible architectures for a module (e.g., XIMM) in a simulation (Xockets MAX and MIN). Xockets MIN (420a) can be used in low-end public cloud servers, containing twenty ARM cores (420b) spread across fourteen DIMM slots in a commodity server which has two Opteron x86 processors and two network interface cards (NICs) (420c). This architecture can provide a minimal benefit per Watt of power used. Xockets MAX (422a) contains eighty ARM cores (422b) across eight DIMM slots, in a server with two Opteron x86 processors and four NICs (422c). This architecture can provide a maximum benefit per Watt of power used.

FIG. 4-4 shows a representative power budget for an example of a module (e.g., XIMM) according to a particular embodiment. Each component is listed (424a, 424b, 424c, 424d) along with its power profile. Average total and total wattages are also listed (426a, 426b). In total, especially for I/O packet processing with packet sizes on the order 1 KB in size, module can have a low average power budget that is easily able to be provided by the 22 $V_{dd}$ pins per DIMM. Additionally, the expected thermal output can be handled by inexpensive conductive heat spreaders, without requiring additional convective, conductive, or thermoelectric cooling. In certain situations, digital thermometers can be implemented to dynamically reduce performance (and consequent heat generation) if needed.

Figures 1, 5:
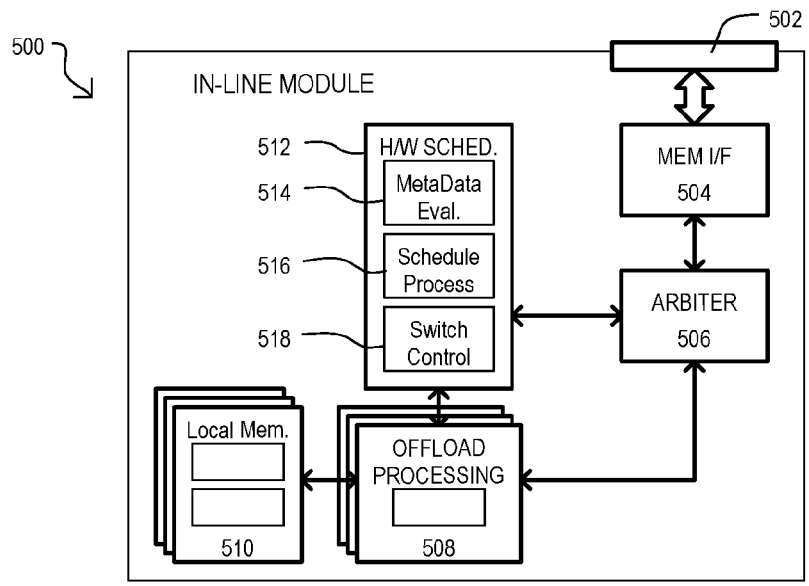
Figures 2, 5:
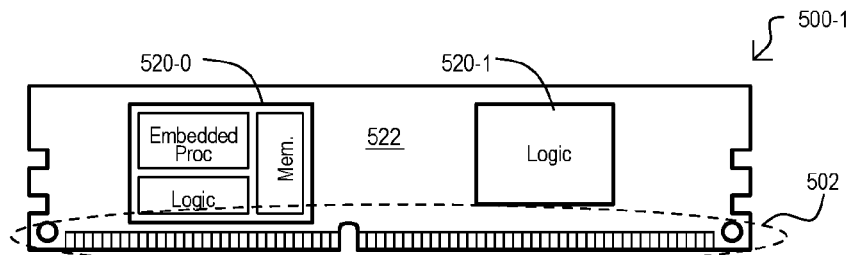
Figures 3, 5:
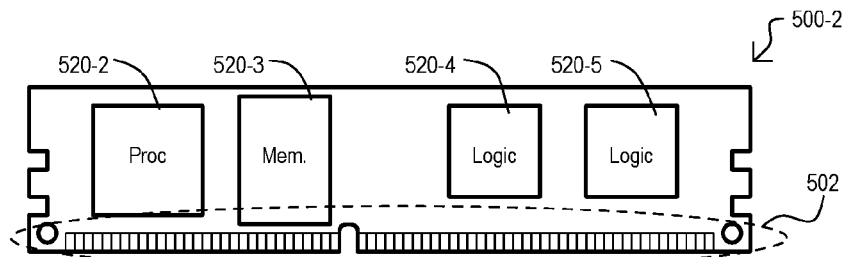
Figures 4, 5:
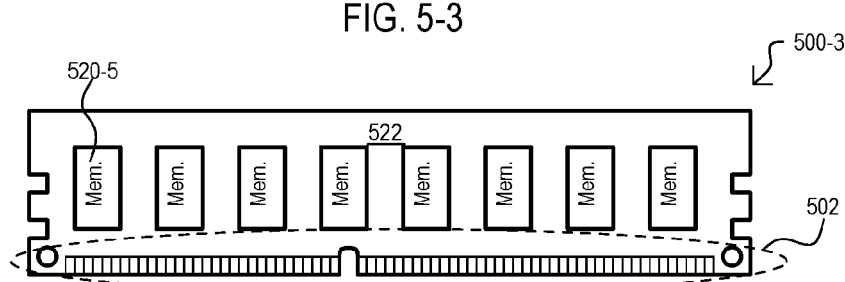
Figure 5:
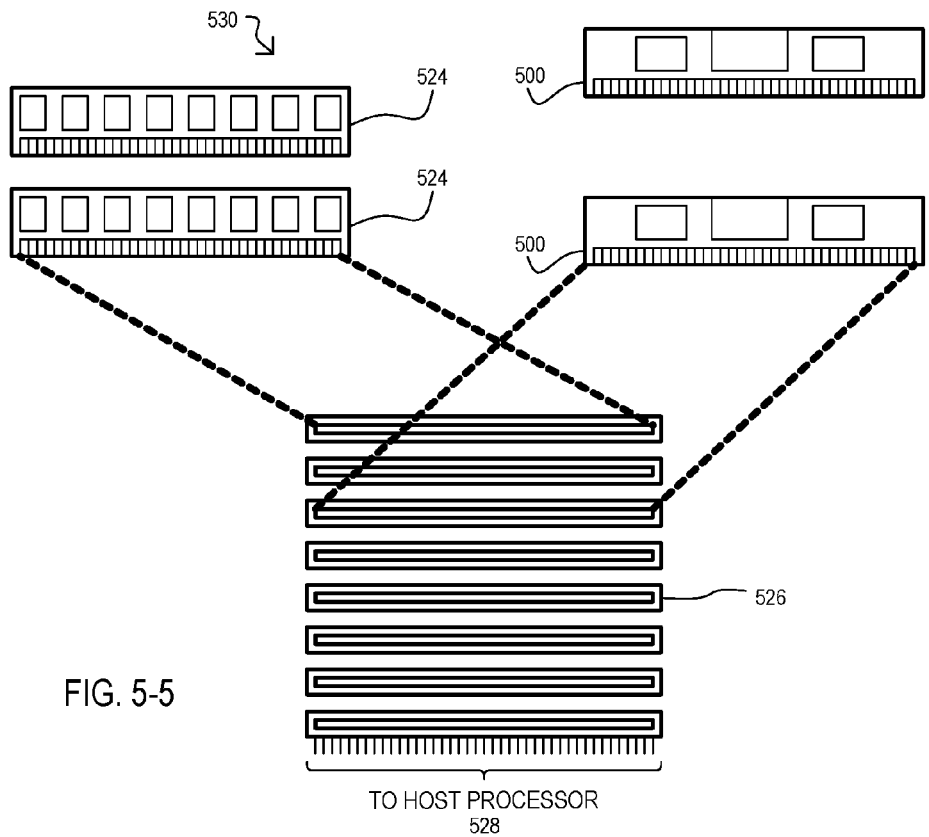

Operation of one embodiment of a module 430 (e.g., XIMM) using an ARM A9 architecture is illustrated with respect to FIG. 4-5. Use of ARM A9 architecture in conjunction with an FPGA fabric and memory, in this case shown as reduced latency DRAM (RLDRAM) 438, can simplify or makes possible zero-overhead context switching, memory compression and CPI, in part by allowing hardware context switching synchronized with network queuing. In this way, there can be a one-to-one mapping between thread and queues. As illustrated, the ARM A9 architecture includes a Snoop Control Unit 432 (SCU). This unit allows one to read out and write in memory coherently. Additionally, the Accelerator Coherency Port 434 (ACP) allows for coherent supplementation of the cache throughout the FPGA 436. The RLDRAM 438 provides the auxiliary bandwidth to read and write the ping-pong cache supplement (435): Block1$ and Block2$ during packet-level meta-data processing.

The following table (Table 1) illustrates potential states that can exist in the scheduling of queues/threads to XIMM processors and memory such as illustrated in FIG. 4-5.

TABLE 1

| Queue/Thread State | HW treatment |
|---|---|
| Waiting for Ingress Packet | All ingress data has been processed and thread awaits further communication. |
| Waiting for MMIO | A functional call to MM hardware (such as HW encryption or transcoding) was made. |
| Waiting for Rate-limit | The thread's resource consumption exceeds limit, due to other connections idling. |
| Currently being processed | One of the ARM cores is already processing this thread, cannot schedule again. |
| Ready for Selection | The thread is ready for context selection. |

These states can help coordinate the complex synchronization between processes, network traffic, and memory-mapped hardware. When a queue is selected by a traffic manager a pipeline coordinates swapping in the desired L2 cache (440), transferring the reassembled IO data into the memory space of the executing process. In certain cases, no packets are pending in the queue, but computation is still pending to service previous packets. Once this process makes a memory reference outside of the data swapped, a scheduler can require queued data from a network interface card (NIC) to continue scheduling the thread. To provide fair queuing to a process not having data, the maximum context size is assumed as data processed. In this way, a queue must be provisioned as the greater of computational resource and network bandwidth resource, for example, each as a ratio of an 800 MHz A9 and 3 Gbps of bandwidth. Given the lopsidedness of this ratio, the ARM core is generally indicated to be worthwhile for computation having many parallel sessions (such that the hardware's prefetching of session-specific data and TCP/reassembly offloads a large portion of the CPU load) and those requiring minimal general purpose processing of data.

Essentially zero-overhead context switching is also possible using modules as disclosed in FIG. 4-5. Because per packet processing has minimum state associated with it, and represents inherent engineered parallelism, minimal memory access is needed, aside from packet buffering. On the other hand, after packet reconstruction, the entire memory state of the session can be accessed, and so can require maximal memory utility. By using the time of packet-level processing to prefetch the next hardware scheduled application-level service context in two different processing passes, the memory can always be available for prefetching. Additionally, the FPGA 436 can hold a supplemental "ping-pong" cache (435) that is read and written with every context switch, while the other is in use. As previously noted, this is enabled in part by the SCU 432, which allows one to read out and write in memory coherently, and ACP 434 for coherent supplementation of the cache throughout the FPGA 436. The RLDRAM 438 provides for read and write to the ping-pong cache supplement (435): (shown as Block1$ and Block2$) during packet-level meta-data processing. In the embodiment shown, only locally terminating queues can prompt context switching.

In operation, metadata transport code can relieve a main or host processor from tasks including fragmentation and reassembly, and checksum and other metadata services (e.g., accounting, IPSec, SSL, Overlay, etc.). As IO data streams in and out, L1 cache 437 can be filled during packet processing. During a context switch, the lockdown portion of a translation lookaside buffer (TLB) of an L1 cache can be rewritten with the addresses corresponding to the new context. In one very particular implementation, the following four commands can be executed for the current memory space.

MRC p15,0,r0,c10,c0,0; read the lockdown register
BIC r0,r0,#1; clear preserve bit
MCR p15,0,r0,c10,c0,0; write to the lockdown register;
write to the old value to the memory mapped Block RAM This is a small 32 cycle overhead to bear. Other TLB entries can be used by the XIMM stochastically.

Bandwidths and capacities of the memories can be precisely allocated to support context switching as well as applications such as Openflow processing, billing, accounting, and header filtering programs.

For additional performance improvements, the ACP 434 can be used not just for cache supplementation, but hardware functionality supplementation, in part by exploitation of the memory space allocation. An operand can be written to memory and the new function called, through customizing specific Open Source libraries, so putting the thread to sleep and a hardware scheduler can validate it for scheduling again once the results are ready. For example, OpenVPN uses the OpenSSL library, where the encrypt/decrypt functions 439 can be memory mapped. Large blocks are then available to be exported without delay, or consuming the L2 cache 440, using the ACP 434. Hence, a minimum number of calls are needed within the processing window of a context switch, improving overall performance.

FIG. 5-1 is a block diagram of a processing module 500 according to another embodiment. A processing module 500 can be one implementation of XIMM as described herein. A processing module 500 can include a physical in-line module connector 502, a memory interface 504, arbiter logic 506, offload processor(s) 508, local memory 510, and control logic 512. A connector 502 can provide a physical connection to system memory bus. This is in contrast to a host processor which can access a system memory bus via a memory controller, or the like. In very particular embodiments, a connector 502 can be compatible with a dual in-line memory module (DIMM) slot of a computing system. Accordingly, a system including multiple DIMM slots can be populated with one or more processing modules 500, or a mix of processing modules and DIMM modules.

A memory interface 504 can detect data transfers on a system memory bus, and in appropriate cases, enable write data to be stored in the processing module 500 and/or read data to be read out from the processing module 500. In some embodiments, a memory interface 504 can be a slave interface, thus data transfers are controlled by a master device separate from the processing module. In very particular embodiments, a memory interface 504 can be a direct memory access (DMA) slave, to accommodate DMA transfers over a system memory initiated by a DMA master. Such a DMA master can be a device different from a host processor. In such configurations, processing module 500 can receive data for processing (e.g., DMA write), and transfer processed data out (e.g., DMA read) without consuming host processor resources.

Arbiter logic 506 can arbitrate between conflicting data accesses within processing module 500. In some embodiments, arbiter logic 506 can arbitrate between accesses by offload processor 508 and accesses external to the processor module 500. It is understood that a processing module 500 can include multiple locations that are operated on at the same time. It is also understood that accesses that are arbitrated by arbiter logic 506 can include accesses to physical system memory space occupied by the processor module 500, as well as accesses to resources (e.g., processor resources). Accordingly, arbitration rules for arbiter logic 506 can vary according to application. In some embodiments, such arbitration rules are fixed for a given processor module 500. In such cases, different applications can be accommodated by switching out different processing modules. However, in alternate embodiments, such arbitration rules can be configurable while the module is connected to a data bus.

Offload processor(s) 508 can include one or more processors that can operate on data transferred over the system memory bus. In some embodiments, offload processors can run a general operating system, enabling processor contexts to be saved and retrieved. Computing tasks executed by offload processor 508 can be controlled by control logic 512. Offload processor(s) 508 can operate on data buffered in the processing module 500. In addition or alternatively, offload processor(s) 508 can access data stored elsewhere in a system memory space. In some embodiment, offload processor(s) 508 can include a cache memory configured to store context information. An offload processor(s) 508 can include multiple cores or one core.

A processing module 500 can be included in a system having a host processor (not shown). In some embodiments, offload processors 508 can be a different type of processor as compared to the host processor. In particular embodiments, offload processors 508 can consume less power and/or have less computing power than a host processor. In very particular embodiments, offload processors 508 can be "wimpy" core processors, while a host processor can be a "brawny" core processor. In alternate embodiments, offload processors 508 can have equivalent or greater computing power than any host processor.

Local memory 510 can be connected to offload processor(s) 508 to enable the storing of context information. Accordingly, offload processor(s) 508 can store current context information, and then switch to a new computing task, then subsequently retrieve the context information to resume the prior task. In very particular embodiments, local memory 510 can be a low latency memory with respect to other memories in a system. In some embodiments, storing of context information can include copying a cache of an offload processor 508 to the local memory 510.

In some embodiments, a same space within local memory 510 is accessible by multiple offload processors 508 of the same type. In this way, a context stored by one offload processor can be resumed by a different offload processor.

Control logic 512 can control processing tasks executed by offload processor(s) 508. In some embodiments, control logic 512 can be considered a hardware scheduler that can be conceptualized as including a data evaluator 514, scheduler 516 and a switch controller 518. A data evaluator 514 can extract "metadata" from write data transferred over a system memory bus. "Metadata", as used herein, can be any information embedded at one or more predetermined locations of a block of write data that indicates processing to be performed on all or a portion of the block of write data. In some embodiments, metadata can be data that indicates a higher level organization for the block of write data. As but one very particular embodiment, metadata can be header information of network packet (which may or may not be encapsulated within a higher layer packet structure).

A scheduler 516 can order computing tasks for offload processor(s) 508. In some embodiments, scheduler 516 can generate a schedule that is continually updated as write data for processing is received. In very particular embodiments, a scheduler 516 can generate such a schedule based on the ability to switch contexts of offload processor(s) 508. In this way, module computing priorities can be adjusted on the fly. In very particular embodiments, a scheduler 516 can assign a portion of physical address space to an offload processor 508, according to computing tasks. The offload processor 508 can then switch between such different spaces, saving context information prior to each switch, and subsequently restoring context information when returning to the memory space.

Switch controller 518 can control computing operations of offload processor(s) 508. In particular embodiments, according to scheduler 516, switch controller 518 can order offload processor(s) 510 to switch contexts. It is understood that a context switch operation can be an "atomic" operation, executed in response to a single command from switch controller 518. In addition or alternatively, a switch controller 518 can issue an instruction set that stores current context information, recalls context information, etc.

In some embodiments, processing module 500 can include a buffer memory (not shown). A buffer memory can store received write data on-board the processor module 500. A buffer memory can be implemented on an entirely different set of memory devices, or can be a memory embedded with logic and/or the offload processor. In the latter case, arbiter logic 506 can arbitrate access to the buffer memory. In some embodiments, a buffer memory can correspond to a portion of a system physical memory space. The remaining portion of the system memory space can correspond to other like processor modules and/or memory modules connected to the same system memory bus. In some embodiments buffer memory can be different than local memory 510. For example, buffer memory can have a slower access time than a local memory 510. However, in other embodiments, buffer memory and local memory can be implemented with like memory devices.

In very particular embodiments, write data for processing can have an expected maximum flow rate. A processor module 500 can be configured to operate on such data at, or faster than, such a flow rate. In this way, a master device (not shown) can write data to a processor module without danger of overwriting data "in process".

The various computing elements of a processor module 500 can be implemented as one or more integrated circuit devices (ICs). It is understood that the various components shown in FIG. 5-1 can be formed in the same or different ICs. For example, control logic 512, memory interface 514, and/or arbiter logic 506 can be implemented on one or more logic ICs, while offload processor(s) 508 and local memory 510 are separate ICs. Logic ICs can be fixed logic (e.g., application specific ICs), programmable logic (e.g., field programmable gate arrays, FPGAs), or combinations thereof.

FIG. 5-2 shows a processor module 500-1 according to one very particular embodiment. A processor module 500-1 can include ICs 520-0/1 mounted to a printed circuit board (PCB) type substrate 522. PCB type substrate 522 can include in-line module connection 502, which in one very particular embodiment can be a DIMM compatible connection. IC 520-0 can be a system-on-chip (SoC) type device, integrating multiple functions. In the very particular embodiment shown, an IC 520-0 can include embedded processor(s), logic and memory. Such embedded processor(s) can be offload processor(s) 508 as described herein, or equivalents. Such logic can be any of controller logic 512, memory interface 504 and/or arbiter logic 506, as described herein, or equivalents. Such memory can be any of local memory 510, cache memory for offload processor(s) 508, or buffer memory, as described herein, or equivalents. Logic IC 520-1 can provide logic functions not included IC 520-0.

FIG. 5-3 shows a processor module 500-2 according to another very particular embodiment. A processor module 500-2 can include ICs 520-2, -3, -4, -5 mounted to a PCB type substrate 522, like that of FIG. 5-2. However, unlike FIG. 5-2, processor module functions are distributed among single purpose type ICs. IC 520-2 can be a processor IC, which can be an offload processor 508. IC 520-3 can be a memory IC which can include local memory 510, buffer memory, or combinations thereof. IC 520-4 can be a logic IC which can include control logic 512, and in one very particular embodiment, can be an FPGA. IC 520-5 can be another logic IC which can include memory interface 504 and arbiter logic 506, and in one very particular embodiment, can also be an FPGA.

It is understood that FIGS. 5-2 and 5-3 represent but two of various implementations. The various functions of a processor module can be distributed over any suitable number of ICs, including a single SoC type IC.

FIG. 5-4 shows an opposing side of a processor module 500-3 according to a very particular embodiment. Processor module 500-3 can include a number of memory ICs, one shown as 520-5, mounted to a PCB type substrate 522, like that of FIG. 5-2. It is understood that various processing and logic components can be mounted on an opposing side to that shown. Memory ICs 520-5 can be configured to represent a portion of the physical memory space of a system. Memory ICs 520-5 can perform any or all of the following functions: operate independently of other processor module components, providing system memory accessed in a conventional fashion; serve as buffer memory, storing write data that can be processed with other processor module components; or serve as local memory for storing processor context information.

FIG. 5-4 can also represent a conventional DIMM module (i.e., it serves only a memory function) that can populate a memory bus along with processor modules as described herein, or equivalents.

FIG. 5-5 shows a system 530 according to one embodiment. A system 530 can include a system memory bus 528 accessible via multiple in-line module slots (one shown as 526). According to embodiments, any or all of the slots 526 can be occupied by a processor module 500 as described herein, or an equivalent. In the event all slots 526 are not occupied by a processor module 500, available slots can be occupied by conventional in-line memory modules 524. In a very particular embodiment, slots 526 can be DIMM slots.

In some embodiments, a processor module 500 can occupy one slot. However, in other embodiments, a processor module can occupy multiple slots (i.e., include more than one connection). In some embodiments, a system memory bus 528 can be further interfaced with one or more host processors and/or input/output devices (not shown).

Having described processor modules according to various embodiments, operations of a processor module according to particular embodiments will now be described. FIGS. 5-6 to 5-11 show processor module operations according to various embodiments. FIGS. 5-6 to 5-11 show a processor module like that of FIG. 5-1, along with a system memory bus 528, and a buffer memory 532. It is understood that in some embodiments, a buffer memory 532 can part of processor module 500. In such a case, arbitration between accesses via system memory 528 and offload processors can be controlled by arbiter logic 506.

Figures 5, 6:
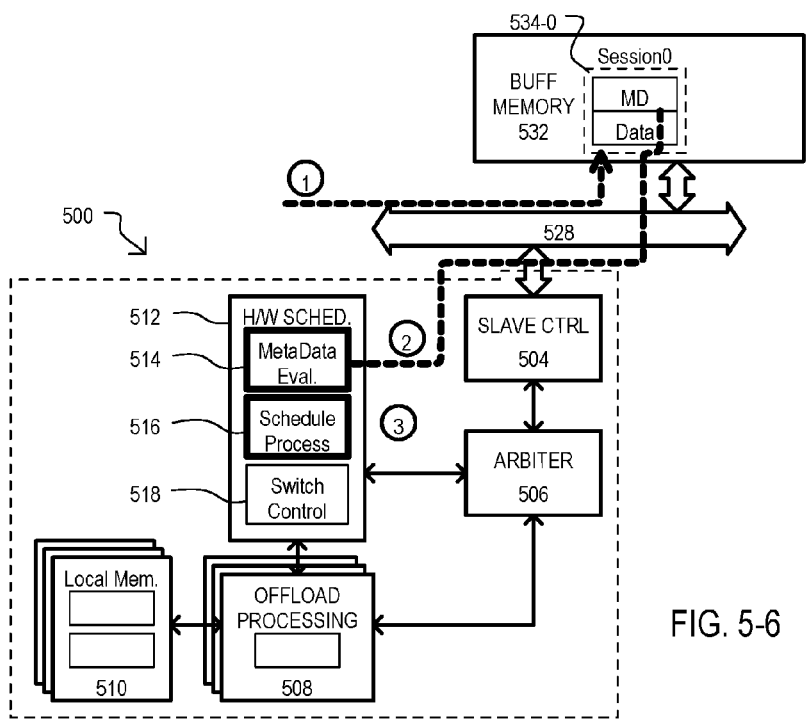

Referring to FIG. 5-6, write data 534-0 can be received on system memory bus 528 (circle "1"). In some embodiments, such an action can include the writing of data to a particular physical address space range of a system memory. In a very particular embodiment, such an action can be a DMA write independent of any host processor. Write data 534-0 can include metadata (MD) as well as data to be processed (Data). In the embodiment shown, write data 534-0 can correspond to a particular processing operation (Session0).

Control logic 512 can access metadata (MD) of the write data 534-0 to determine a type of processing to be performed (circle "2"). In some embodiments, such an action can include a direct read from a physical address (i.e., MD location is at a predetermined location). In addition or alternatively, such an action can be an indirect read (i.e., MD is accessed via pointer, or the like). The action shown by circle "2" can be performed by any of: a read by control logic 512 or read by an offload processor 508. From extracted metadata, scheduler 516 can create a processing schedule, or modify an existing schedule to accommodate the new computing task (circle "3").

Figures 5, 6, 7:
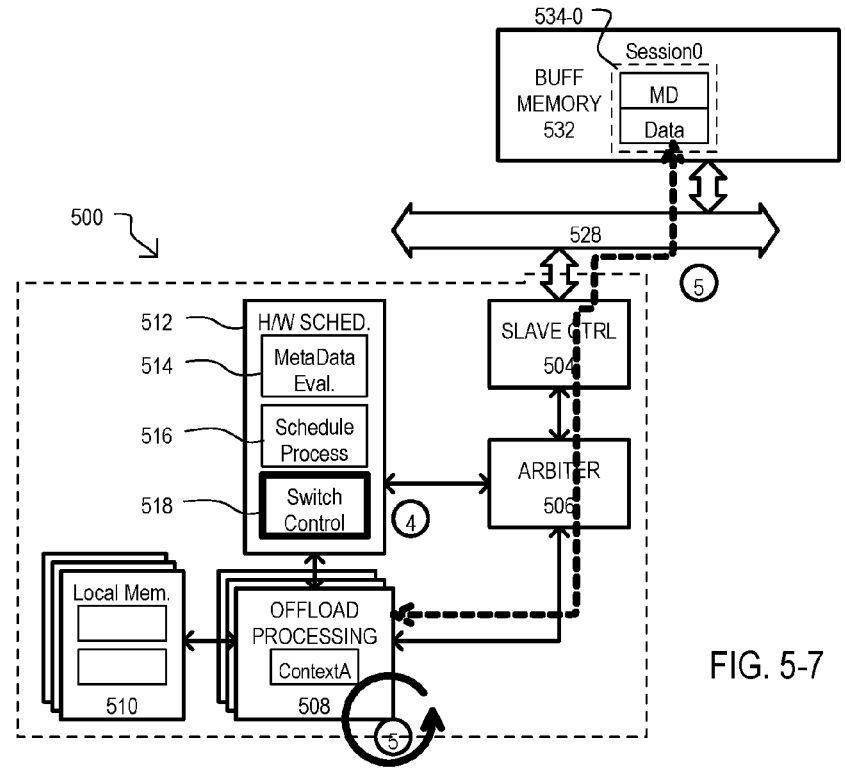
Figures 5, 6, 7, 8:
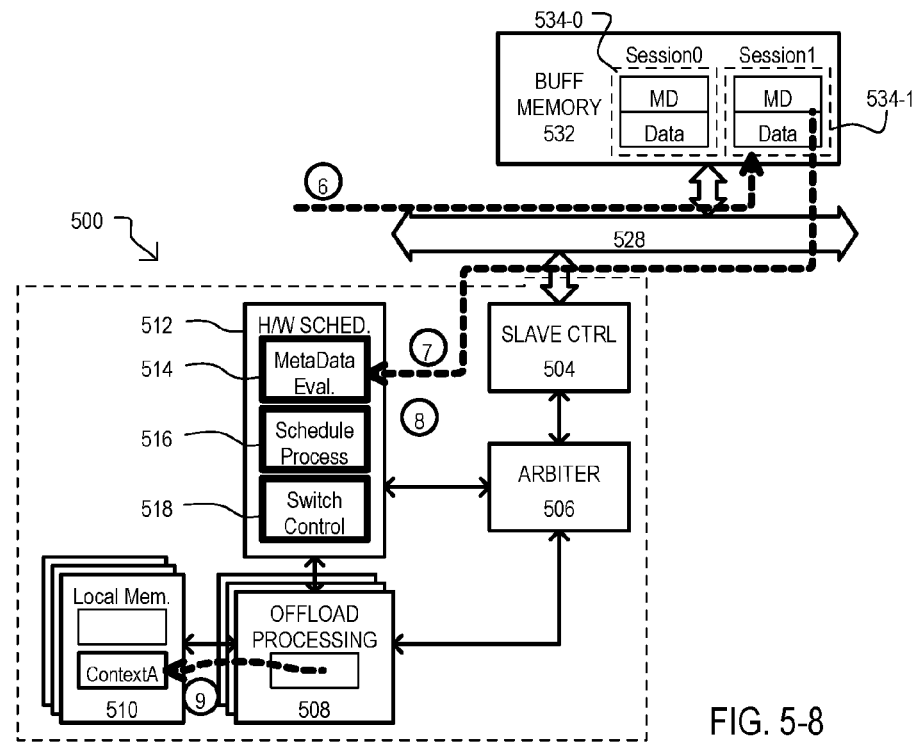
Figures 5, 6, 7, 8, 9:
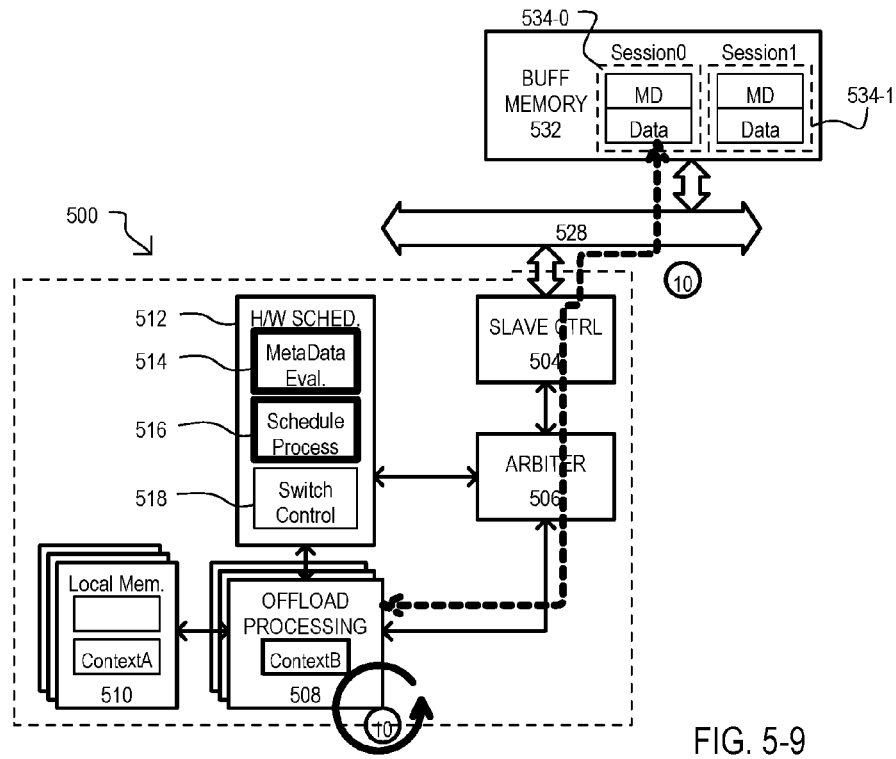
Figures 5, 6, 7, 8, 9, 10:
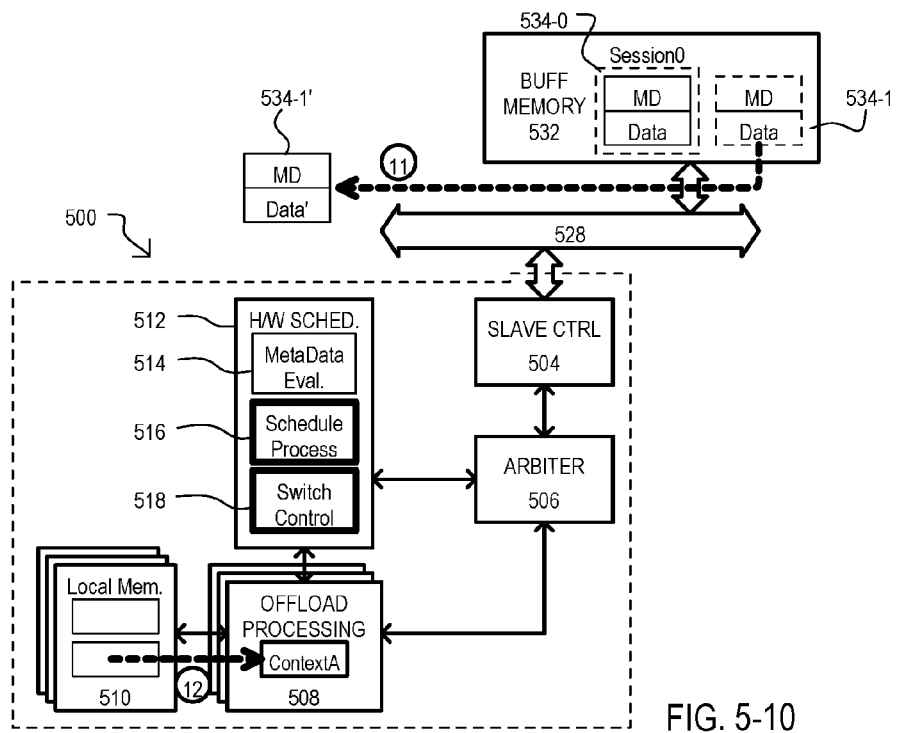
Figures 5, 6, 7, 8, 9, 10, 11:
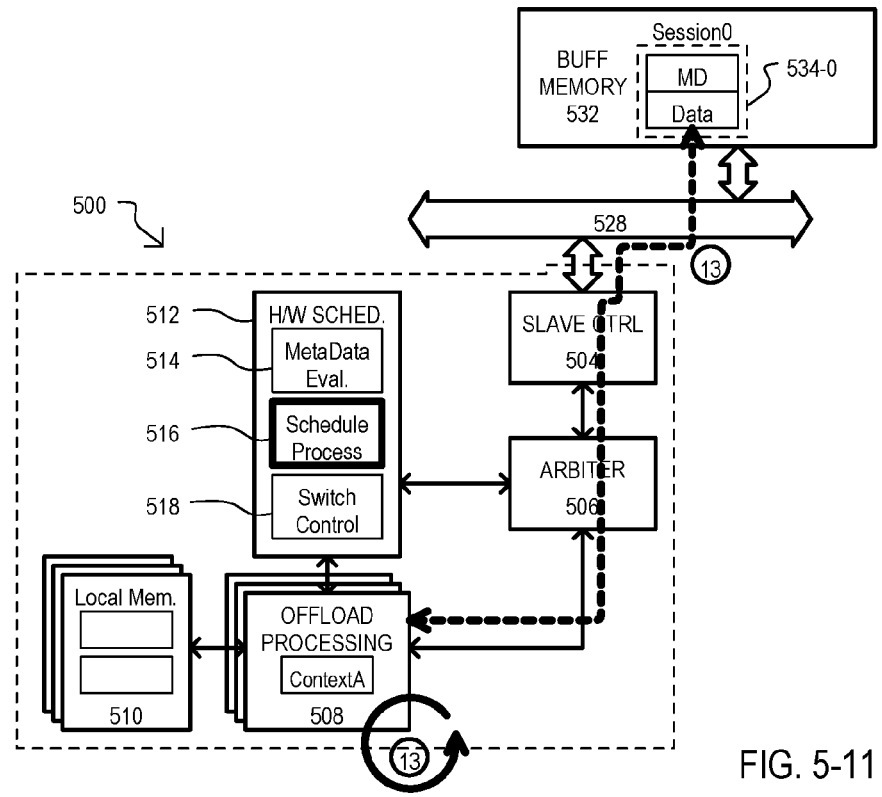
Figures 5, 6, 7, 8, 9, 10, 11, 12:
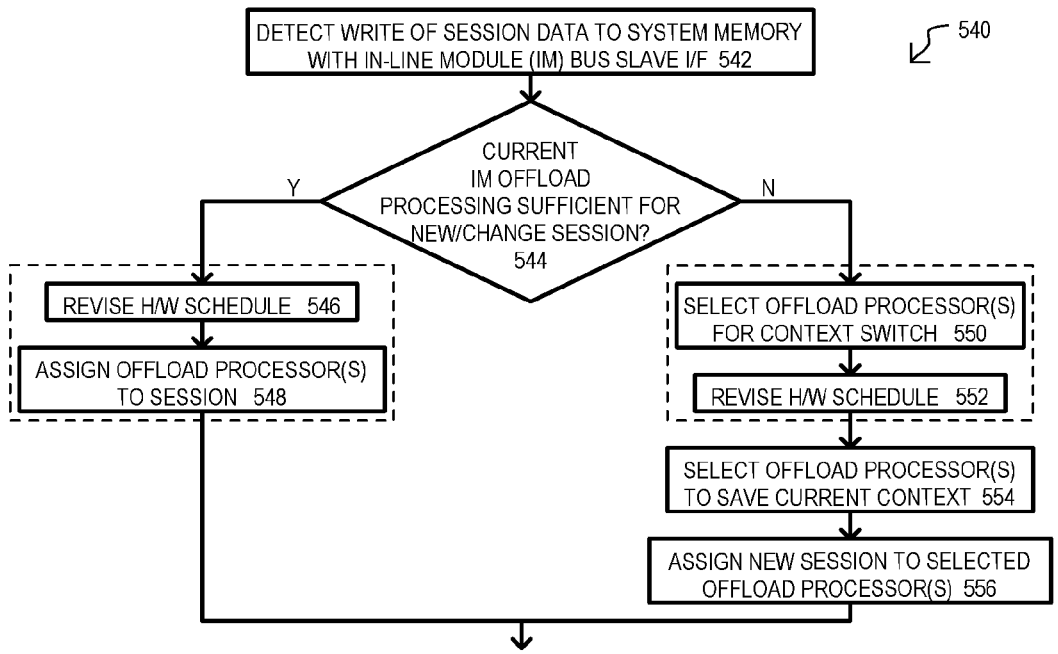
Figures 5, 6, 7, 8, 9, 10, 11, 12, 13:
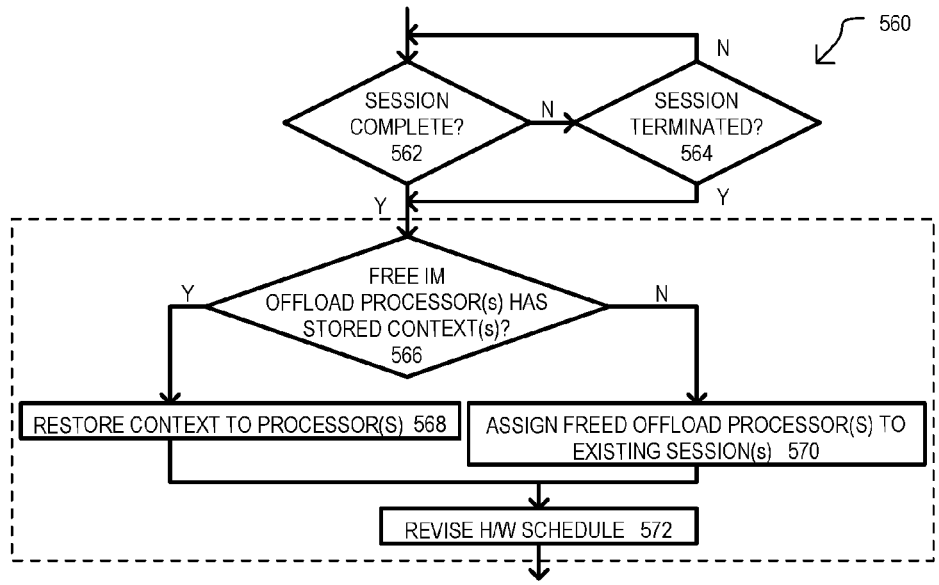
Figures 1, 6:
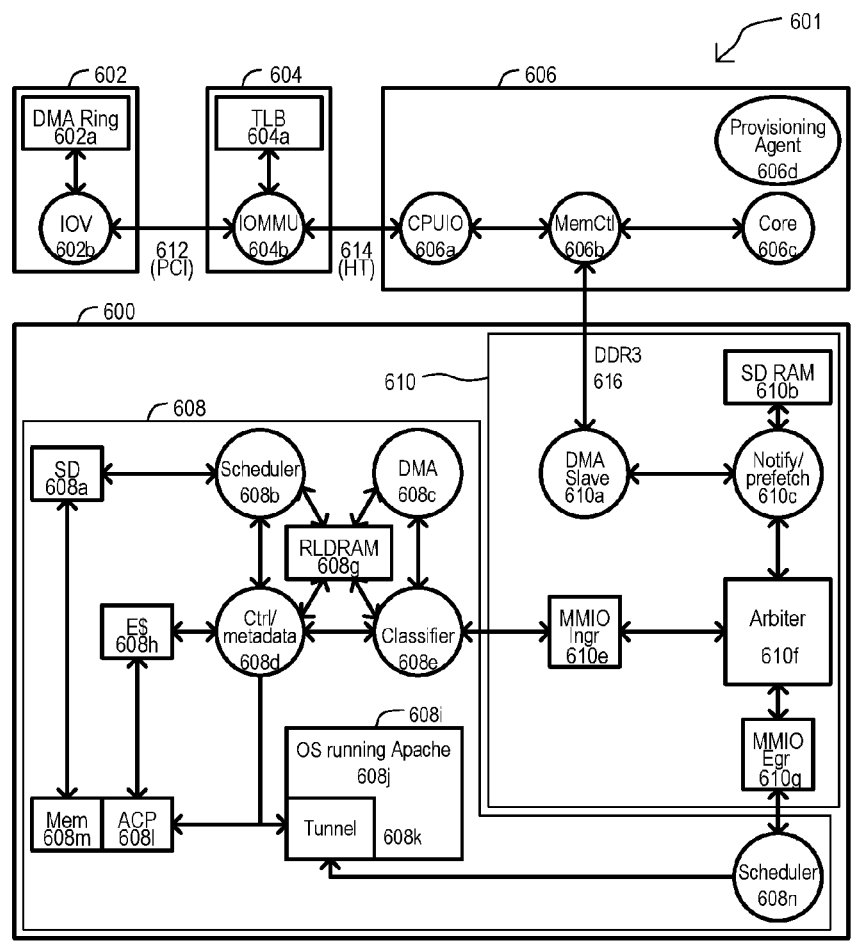
Figures 2, 6:
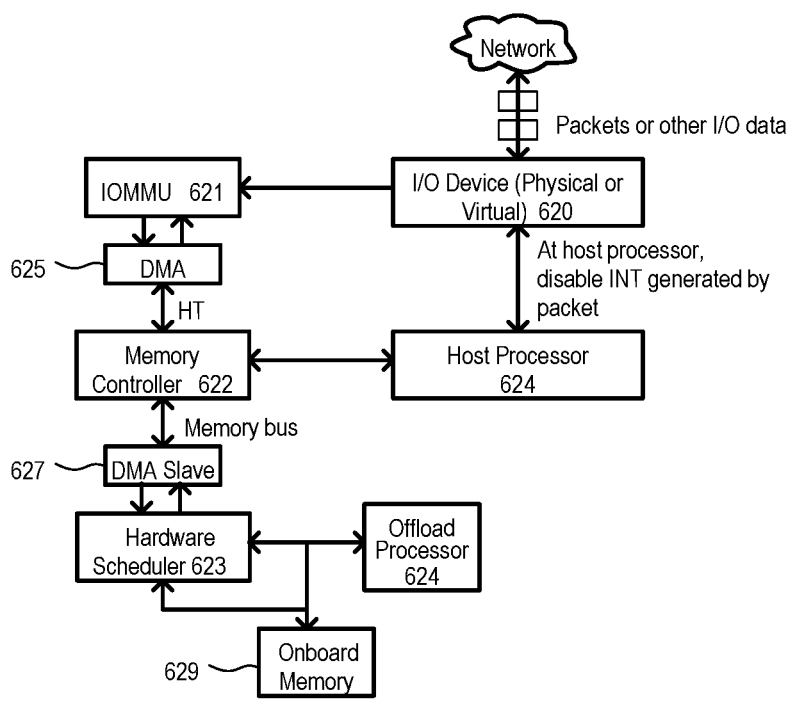

Referring to FIG. 5-7, in response to a scheduler 516, switch controller 518 can direct one or more offload processors 508 be begin processing data according to MD of the write data (circles "4", "5"). Such processing of data can include any of the following and equivalents: offload processor 508 can process write data stored in a buffer memory of the processor module 500, with accesses being arbitrated by arbiter logic 506; offload processor 508 can operate on data previously received; offload processor 508 can receive and operation on data stored at a location different than the processor module 500.

Referring to FIG. 5-8, additional write data 534-1 can be received on system memory bus 528 (circle "6"). Write data 534-1 can include MD that indicates a different processing operation (Session1) than that for write data 534-0. Control logic 512 can access metadata (MD) of the new write data 534-1 to determine a type of processing to be performed (circle "7"). From extracted metadata, scheduler 516 can modify the current schedule to accommodate the new computing task (circle "8"). In the particular example shown, the modified schedule re-tasks offload processor(s) 508. Thus, switch controller 518 can direct an offload processor 508 to store its current context (ContextA) in local memory 510 (circle "9").

Referring to FIG. 5-9, in response to switch controller 518, offload processor(s) 508 can begin the new processing task (circle "10"). Consequently, offload processor(s) 508 can maintain a new context (ContextB) corresponding to the new processing task.

Referring to FIG. 5-10, a processing task by offload processor 508 can be completed. In the very particular embodiment shown, such processing can modify write data (534-1) and such modified data 534-1' can be read out over system memory bus 528 (circle "11"). In response to the completion of processing task, scheduler 516 can update a schedule. In the example shown, in response to the updated schedule, switch controller 518 can direct offload processor(s) 508 to restore the previously saved context (ContextA) from local memory 510 (circle "12"). As understood from above, in some particular embodiments, a restored context (e.g., ContextA) may have been stored by an offload processor different from the one that saved the context in the first place.

Referring to FIG. 5-11, with a previous context restored, offload processor(s) 508 can return to processing data according to the previous task (Session0) (circle "13").

FIG. 5-12 shows a method 540 according an embodiment. A method 540 can include detecting the write of session data to a system memory with an in-line module slave interface 542. Such an action can include determining if received write data has metadata (i.e., data identifying a particular processing). It is understood that "session data" is data corresponding to a particular processing task. Further, it is understood that MD accompanying (or embedded within) session data can identify the priority of a session with respect to other sessions.

A method 540 can determine if current offload processing is sufficient for a new session or change of session 544. Such an action take into account a processing time required for any current sessions.

If current processing resources can accommodate new session requirements (Y from 544), a hardware schedule (schedule for controlling offload processor(s)) can be revised and the new session can be assigned to an offload processor. If current processing resources cannot accommodate new session requirements (N from 544), one or more offload processors can be selected for re-tasking (e.g., a context switch) 550 and the hardware schedule can be modified accordingly 552. The selected offload processors can save their current context data 554 and then switch to the new session 556.

FIG. 5-13 shows a method 560 according another embodiment. A method 560 can include determining if a computing session for an offload processor is complete 562 or has been terminated 564. In such cases (Y from 562/564), it can be determined if the free in-line module offload processor (i.e., an offload processor whose session is complete/terminated) has a stored context 566. That is, it can be determined if the free processor was previously operating on a session.

If a free offload processor was operating according to another session (Y from 566), the offload processor can restore the previous context 568. If a free offload processor has no stored context, it can be assigned to an existing session (if possible) 570. An existing hardware schedule can be updated correspondingly 572.

Processor modules according to embodiments herein can be employed to accomplish various processing tasks. According to some embodiments, processor modules can be attached to a system memory bus to operate on network packet data. Such embodiments will now be described.

FIG. 6-1 shows a system 601 that can transport packet data to one or more computational units (one shown as 600)

located on a module, which in particular embodiments, can include a connector compatible with an existing memory module. In some embodiments, a computational unit 600 can include a processor module (e.g., XIMM) as described in embodiments herein, or an equivalent. A computational unit 600 can be capable of intercepting or otherwise accessing packets sent over a memory bus 616 and carrying out processing on such packets, including but not limited to termination or metadata processing. A system memory bus 616 can be a system memory bus like those described herein, or equivalents (e.g., 528).

According to some embodiments, packets corresponding to a particular flow can be transported to a storage location accessible by, or included within computational unit 600. Such transportation can occur without consuming resources of a host processor module 606c connected to memory bus 616. In particular embodiments, such transport can occur without interrupting the host processor module 606c. In such an arrangement, a host processor module 606c does not have to handle incoming flows. Incoming flows can be directed to computational unit 600, which in particular embodiments can include one or more general purpose processors 608i. Such general purpose processors 608i can be capable of running code for terminating incoming flows.

In one very particular embodiment, a general purpose processor 608i can run code for terminating particular network flow session types, such as Apache video sessions, as but one example.

In addition or alternatively, a general purpose processor 608i can process metadata of a packet. In such embodiments, such metadata can include one or more fields of a header for the packet, or a header encapsulated further within the packet.

Referring still to FIG. 6-1, according to embodiments, a system 601 can carry out any of the following functions: 1) transport packets of a flow to a destination occupied by, or accessible by, a computational unit 600 without interrupting a host processor module 606c; 2) transport packets to an offload processor 608i capable of terminating session flows (i.e., the offload processor is responsible for terminating session flows); 3) transport packets to a midplane switch that can process the metadata associated with a packet and make a switching decision; or 4) provide a novel high speed packet terminating system.

Conventional packet processing systems can utilize host processors for packet termination. However, due to the context switching involved in handling multiple sessions, conventional approaches require significant processing overhead for such context switching, and can incur memory access and network stack delay.

In contrast to conventional approaches, embodiments as disclosed herein can enable high speed packet termination by reducing context switch overhead of a host processor. Embodiments can provide any of the following functions: 1) offload computation tasks to one or more processors via a system memory bus, without the knowledge of the host processor, or significant host processor involvement; 2) interconnect servers in a rack or amongst racks by employing offload processors as switches; or 3) use I/O virtualization to redirect incoming packets to different offload processors.

Referring still to FIG. 6-1, a system 601 can include an I/O device 602 which can receive packet or other I/O data from an external source. In some embodiments I/O device 602 can include physical or virtual functions generated by the physical device to receive a packet or other I/O data from the network or another computer or virtual machine. In the very particular embodiment shown, an I/O device 602 can include a network interface card (NIC) having input buffer 602a (e.g., DMA ring buffer) and an I/O virtualization function 602b.

According to embodiments, an I/O device 602 can write a descriptor including details of the necessary memory operation for the packet (i.e. read/write, source/destination). Such a descriptor can be assigned a virtual memory location (e.g., by an operating system of the system 601). I/O device 602 can communicate with an input output memory management unit (IOMMU) 604 which can translate virtual addresses to corresponding physical addresses. In the particular embodiment shown, a translation look-aside buffer (TLB) 604a can be used for such translation. Virtual function reads or writes data between I/O device and system memory locations can then be executed with a direct memory transfer (e.g., DMA) via a memory controller 606b of the system 601. An I/O device 602 can be connected to IOMMU 604b by a host bus 612. In one very particular embodiment, a host bus 612 can be a peripheral interconnect (PCI) type bus. IOMMU 604b can be connected to a host processing section 606 at a central processing unit I/O (CPUIO) 606a. In the embodiment shown, such a connection 664 can support a HyperTransport (HT) protocol.

In the embodiment shown, a host processing section 606 can include the CPUIO 606a, memory controller 606b, host processor module 606c and corresponding provisioning agent 606d.

In particular embodiments, a computational unit 600 can interface with the system bus 616 via standard in-line module connection, which in very particular embodiments can include a DIMM type slot. In the embodiment shown, a memory bus 616 can be a DDR3 type memory bus, however alternate embodiments can include any suitable system memory bus. Packet data can be sent by memory controller 606b to via memory bus 616 to a DMA slave interface 610a. DMA slave interface 610a can be adapted to receive encapsulated read/write instructions from a DMA write over the memory bus 616.

A hardware scheduler (608b/c/d/e/h) can perform traffic management on incoming packets by categorizing them according to flow using session metadata. Packets can be queued for output in an onboard memory (610b/608a/608m) based on session priority. When the hardware scheduler determines that a packet for a particular session is ready to be processed by the offload processor 608i, the onboard memory is signaled for a context switch to that session. Utilizing this method of prioritization, context switching overhead can be reduced, as compared to conventional approaches. That is, a hardware scheduler can handle context switching decisions and thus optimizing the performance of the downstream resource (e.g., offload processor 608i).

As noted above, in very particular embodiments, an offload processor 608i can be a "wimpy" core type processor. According to some embodiments, a host processor module 606c can include a "brawny" core type processor (e.g., an x86 or any other processor capable of handling "heavy touch" computational operations). While an I/O device 602 can be configured to trigger host processor interrupts in response to incoming packets, according to embodiments, such interrupts can be disabled, thereby reducing processing overhead for the host processor module 606c. In some very particular embodiments, an offload processor 608i can include an ARM, ARC, Tensilica, MIPS, Strong/ARM or any other processor capable of handling "light touch" operations. Preferably, an offload processor can run a general purpose operating system for executing a plurality of sessions, which can be optimized to work in conjunction with the hardware scheduler in order to reduce context switching overhead.

Referring still to FIG. 6-1, in operation, a system 601 can receive packets from an external network over a network interface. The packets can be directed for processing by either a host processor module 606c or an offload processor 608i based on the classification logic and schematics employed by I/O device 602. In particular embodiments, I/O device 602 can operate as a virtualized NIC, with packets for a particular logical network or to a certain virtual MAC (VMAC) address being directed into separate queues and sent over to the destination logical entity. Such an arrangement can transfer packets to different entities. In some embodiments, each such entity can have a virtual driver, a virtual device model that it uses to communicate with virtual network interfaces it is connected to.

According to embodiments, multiple devices can be used to redirect traffic to specific memory addresses. So, each of the network devices operates as if it is transferring the packets to the memory location of a logical entity. However, in reality, such packets can be transferred to memory addresses where they can be handled by one or more offload processors. In particular embodiments such transfers are to physical memory addresses, thus logical entities can be removed from the processing, and a host processor can be free from such packet handling.

Accordingly, embodiments can be conceptualized as providing a memory "black box" to which specific network data can be fed. Such a memory black box can handle the data (e.g., process it) and respond back when such data is requested.

Referring still to FIG. 6-1, according to some embodiments, I/O device 602 can receive data packets from a network or from a computing device. The data packets can have certain characteristics, including transport protocol number, source and destination port numbers, source and destination IP addresses, for example. The data packets can further have metadata that is processed (608d) that helps in their classification and management.

I/O device 602 can include, but is not limited to, peripheral component interconnect (PCI) and/or PCI express (PCIe) devices connecting with host motherboard via PCI or PCIe bus (e.g., 612). Examples of I/O devices include a network interface controller (NIC), a host bus adapter, a converged network adapter, an ATM network interface etc.

In order to provide for an abstraction scheme that allows multiple logical entities to access the same I/O device 602, the I/O device may be virtualized to provide for multiple virtual devices each of which can perform some of the functions of the physical I/O device. The IO virtualization program, according to an embodiment, can redirect traffic to different memory locations (and thus to different offload processors attached to modules on a memory bus). To achieve this an I/O device 602 (e.g., a network card) may be partitioned into several function parts; including controlling function (CF) supporting input/output virtualization (IOV) architecture (e.g., single-root IOV) and multiple virtual function (VF) interfaces. Each virtual function interface may be provided with resources during runtime for dedicated usage. Examples of the CF and VF may include the physical function and virtual functions under schemes such as Single Root I/O Virtualization or Multi-Root I/O Virtualization architecture. The CF acts as the physical resources that sets up and manages virtual resources. The CF is also capable of acting as a full-fledged IO device. The VF is responsible for providing an abstraction of a virtual device for communication with multiple logical entities/multiple memory regions.

The operating system/the hypervisor/any of the virtual machines/user code running on a host processor module 606c may be loaded with a device model, a VF driver and a driver for a CF. The device model may be used to create an emulation of a physical device for the host processor 606c to recognize each of the multiple VFs that are created. The device model may be replicated multiple times to give the impression to a VF driver (a driver that interacts with a virtual IO device) that it is interacting with a physical device of a particular type.

For example, a certain device module may be used to emulate a network adapter such as the Intel® Ethernet Converged Network Adapter (CNA) X540-T2, so that the I/O device 602 believes it is interacting with such an adapter. In such a case, each of the virtual functions may have the capability to support the functions of the above said CNA, i.e., each of the Physical Functions should be able to support such functionality. The device model and the VF driver can be run in either privileged or non-privileged modes. In some embodiments, there is no restriction with regard to who hosts/runs the code corresponding to the device model and the VF driver. The code, however, has the capability to create multiple copies of device model and VF driver so as to enable multiple copies of said I/O interface to be created.

An application or provisioning agent 606d, as part of an application/user level code running in a kernel, may create a virtual I/O address space for each VF during runtime and allocate part of the physical address space to it. For example, if an application handling the VF driver instructs it to read or write packets from or to memory addresses 0xaaaa to 0xffff, the device driver may write I/O descriptors into a descriptor queue with a head and tail pointer that are changed dynamically as queue entries are filled. The data structure may be of another type as well, including but not limited to a ring structure 602a or hash table.

The VF can read from or write data to the address location pointed to by the driver (and hence to a computational unit 600). Further, on completing the transfer of data to the address space allocated to the driver, interrupts, which are usually triggered to the host processor to handle said network packets, can be disabled. Allocating a specific I/O space to a device can include allocating said IO space a specific physical memory space occupied.

In another embodiment, the descriptor may comprise only a write operation, if the descriptor is associated with a specific data structure for handling incoming packets. Further, the descriptor for each of the entries in the incoming data structure may be constant so as to redirect all data write to a specific memory location. In an alternate embodiment, the descriptor for consecutive entries may point to consecutive entries in memory so as to direct incoming packets to consecutive memory locations.

Alternatively, said operating system may create a defined physical address space for an application supporting the VF drivers and allocate a virtual memory address space to the application or provisioning agent 606d, thereby creating a mapping for each virtual function between said virtual address and a physical address space. Said mapping between virtual memory address space and physical memory space may be stored in IOMMU tables 604a. The application performing memory reads or writes may supply virtual addresses to say virtual function, and the host processor OS may allocate a specific part of the physical memory location to such an application.

Alternatively, VF may be configured to generate requests such as read and write which may be part of a direct memory access (DMA) read or write operation, for example. The virtual addresses is be translated by the IOMMU 604b to their corresponding physical addresses and the physical addresses may be provided to the memory controller for access. That is, the IOMMU 604b may modify the memory requests sourced by the I/O devices to change the virtual address in the request to a physical address, and the memory request may be forwarded to the memory controller for memory access. The memory request may be forwarded over a bus 614. The VF may in such cases carry out a direct memory access by supplying the virtual memory address to the IOMMU 604b.

Alternatively, said application may directly code the physical address into the VF descriptors if the VF allows for it. If the VF cannot support physical addresses of the form used by the host processor 606c, an aperture with a hardware size supported by the VF device may be coded into the descriptor so that the VF is informed of the target hardware address of the device. Data that is transferred to an aperture may be mapped by a translation table to a defined physical address space in the system memory. The DMA operations may be initiated by software executed by the processors, programming the I/O devices directly or indirectly to perform the DMA operations.

Referring still to FIG. 6-1, in particular embodiments, parts of computational unit 600 can be implemented with one or more FPGAs. In the system of FIG. 6-1, computational unit 600 can include FPGA 610 in which can be formed a DMA slave device module 610a and arbiter 610f. A DMA slave module 610a can be any device suitable for attachment to a memory bus 616 that can respond to DMA read/write requests. In alternate embodiments, a DMA slave module 610a can be another interface capable of block data transfers over memory bus 616. The DMA slave module 610a can be capable of receiving data from a DMA controller (when it performs a read from a 'memory' or from a peripheral) or transferring data to a DMA controller (when it performs a write instruction on the DMA slave module 610a). The DMA slave module 610a may be adapted to receive DMA read and write instructions encapsulated over a memory bus, (e.g., in the form of a DDR data transmission, such as a packet or data burst), or any other format that can be sent over the corresponding memory bus.

A DMA slave module 610a can reconstruct the DMA read/write instruction from the memory R/W packet. The DMA slave module 610a may be adapted to respond to these instructions in the form of data reads/data writes to a DMA master, which could either be housed in a peripheral device, in the case of a PCIe bus, or a system DMA controller in the case of an ISA bus.

I/O data that is received by the DMA device 610a can then be queued for arbitration. Arbitration is the process of scheduling packets of different flows, such that they are provided access to available bandwidth based on a number of parameters. In general, an arbiter provides resource access to one or more requestors. If multiple requestors request access, an arbiter 610f can determine which requestor becomes the accessor and then passes data from the accessor to the resource interface, and the downstream resource can begin execution on the data. After the data has been completely transferred to a resource, and the resource has competed execution, the arbiter 610f can transfer control to a different requestor and this cycle repeats for all available requestors. In the embodiment of FIG. 6-1, arbiter 610f can notify other portions of computational unit 600 (e.g., 608) of incoming data.

Alternatively, a computation unit 600 can utilize an arbitration scheme shown in U.S. Pat. No. 7,863,283, issued to Dalal on Oct. 26, 2010, the contents of which are incorporated herein by reference. Other suitable arbitration schemes known in art could be implemented in embodiments herein. Alternatively, the arbitration scheme for an embodiment can be an OpenFlow switch and an OpenFlow controller.

In the very particular embodiment of FIG. 6-1, computational unit 600 can further include notify/prefetch circuits 610c which can prefetch data stored in a buffer memory 610b in response to DMA slave module 610a, and as arbitrated by arbiter 610f. Further, arbiter 610f can access other portions of the computational unit 600 via a memory mapped I/O ingress path 610e and egress path 610g.

Referring to FIG. 6-1, a hardware scheduler can include a scheduling circuit 608b/n to implement traffic management of incoming packets. Packets from a certain source, relating to a certain traffic class, pertaining to a specific application or flowing to a certain socket are referred to as part of a session flow and are classified using session metadata. Such classification can be performed by classifier 608e.

In some embodiments, session metadata 608d can serve as the criterion by which packets are prioritized and scheduled and as such, incoming packets can be reordered based on their session metadata. This reordering of packets can occur in one or more buffers and can modify the traffic shape of these flows. The scheduling discipline chosen for this prioritization, or traffic Management™, can affect the traffic shape of flows and micro-flows through delay (buffering), bursting of traffic (buffering and bursting), smoothing of traffic (buffering and rate-limiting flows), dropping traffic (choosing data to discard so as to avoid exhausting the buffer), delay jitter (temporally shifting cells of a flow by different amounts) and by not admitting a connection (e.g., cannot simultaneously guarantee existing service (SLAs) with an additional flow's SLA).

According to embodiments, computational unit 600 can serve as part of a switch fabric, and provide traffic management with depth-limited output queues, the access to which is arbitrated by a scheduling circuit 608b/n. Such output queues are managed using a scheduling discipline to provide traffic management for incoming flows. The session flows queued in each of these queues can be sent out through an output port to a downstream network element.

It is noted that some conventional traffic management circuits do not take into account the handling and management of data by downstream elements except for meeting the SLA agreements it already has with said downstream elements. In contrast, according to embodiments, a scheduler circuit 608b/n can allocate a priority to each of the output queues and carry out reordering of incoming packets to maintain persistence of session flows in these queues. A scheduler circuit 608b/n can be used to control the scheduling of each of these persistent sessions into a general purpose operating system (OS) 608j, executed on an offload processor 608i. Packets of a particular session flow, as defined above, can belong to a particular queue. The scheduler circuit 608b/n may control the prioritization of these queues such that they are arbitrated for handling by a general purpose (GP) processing resource (e.g., offload processor 608i) located downstream. An OS 608j running on a downstream processor 608i can allocate execution resources such as processor cycles and memory to a particular queue it is currently handling. The OS 608j may further allocate a thread or a group of threads for that particular queue, so that it is handled distinctly by the general purpose processing element 608*i* as a separate entity. Thus, in some embodiments there can be multiple sessions running on a GP processing resource, each handling data from a particular session flow resident in a queue established by the scheduler circuit, to tightly integrate the scheduler and the downstream resource (e.g., 608*i*). This can bring about persistence of session information across the traffic management and scheduling circuit and the general purpose processing resource 608*j*.

Dedicated computing resources (e.g., 608*i*), memory space and session context information for each of the sessions can provide a way of handling, processing and/or terminating each of the session flows at the general purpose processor 608*i*. The scheduler circuit 608*b/n* can exploit this functionality of the execution resource to queue session flows for scheduling downstream. For example, the scheduler circuit 608*b/n* can be informed of the state of the execution resource(s) (e.g., 608*i*), the current session that is run on the execution resource; the memory space allocated to it, the location of the session context in the processor cache.

According to embodiments, a scheduler circuit 608*b/n* can further include switching circuits to change execution resources from one state to another. The scheduler circuit 608*b/n* can use such a capability to arbitrate between the queues that are ready to be switched into the downstream execution resource. Further, the downstream execution resource can be optimized to reduce the penalty and overhead associated with context switch between resources. This is further exploited by the scheduler circuit 608*b/n* to carry out seamless switching between queues, and consequently their execution as different sessions by the execution resource.

A scheduler circuit 608*b/n* according to embodiments can schedule different sessions on a downstream processing resource, wherein the two are operated in coordination to reduce the overhead during context switches. An important factor to decreasing the latency of services and engineering computational availability can be hardware context switching synchronized with network queuing. In embodiments, when a queue is selected by a traffic manager, a pipeline coordinates swapping in of the cache (e.g., L2 cache) of the corresponding resource and transfers the reassembled I/O data into the memory space of the executing process. In certain cases, no packets are pending in the queue, but computation is still pending to service previous packets. Once this process makes a memory reference outside of the data swapped, the scheduler circuit can enable queued data from an I/O device 602 to continue scheduling the thread.

In some embodiments, to provide fair queuing to a process not having data, a maximum context size can be assumed as data processed. In this way, a queue can be provisioned as the greater of computational resource and network bandwidth resource. As but one very particular example, a computation resource can be an ARM A9 processor running at 800 MHz, while a network bandwidth can be 3 Gbps of bandwidth. Given the lopsided nature of this ratio, embodiments can utilize computation having many parallel sessions (such that the hardware's prefetching of session-specific data offloads a large portion of the host processor load) and having minimal general purpose processing of data.

Accordingly, in some embodiments, a scheduler circuit 608*b/n* can be conceptualized as arbitrating, not between outgoing queues at line rate speeds, but arbitrating between terminated sessions at very high speeds. The stickiness of sessions across a pipeline of stages, including a general purpose OS, can be a scheduler circuit optimizing any or all such stages of such a pipeline.

Alternatively, a scheduling scheme can be used as shown in U.S. Pat. No. 7,760,765 issued to Dalal on Jul. 20, 2010, incorporated herein by reference. This scheme can be useful when it is desirable to rate limit the flows for preventing the downstream congestion of another resource specific to the over-selected flow, or for enforcing service contracts for particular flows. Embodiments can include arbitration scheme that allows for service contracts of downstream resources, such as general purpose OS that can be enforced seamlessly.

Referring still to FIG. 6-1, a hardware scheduler according to embodiments herein, or equivalents, can provide for the classification of incoming packet data into session flows based on session metadata. It can further provide for traffic management of these flows before they are arbitrated and queued as distinct processing entities on the offload processors.

In some embodiments, offload processors (e.g., 608*i*) can be general purpose processing units capable of handling packets of different application or transport sessions. Such offload processors can be low power processors capable of executing general purpose instructions. The offload processors could be any suitable processor, including but not limited to: ARM, ARC, Tensilica, MIPS, StrongARM or any other processor that serves the functions described herein. The offload processors have general purpose OS running on them, wherein the general purpose OS is optimized to reduce the penalty associated with context switching between different threads or group of threads.

In contrast, context switches on host processors can be computationally intensive processes that require the register save area, process context in the cache and TLB entries to be restored if they are invalidated or overwritten. Instruction Cache misses in host processing systems can lead to pipeline stalls and data cache misses lead to operation stall and such cache misses reduce processor efficiency and increase processor overhead.

According to embodiments, an OS 608*j* running on the offload processors 608*i* in association with a scheduler circuit, can operate together to reduce the context switch overhead incurred between different processing entities running on it. Embodiments can include a cooperative mechanism between a scheduler circuit and the OS on the offload processor 608*i*, wherein the OS sets up session context to be physically contiguous (physically colored allocator for session heap and stack) in the cache; then communicates the session color, size, and starting physical address to the scheduler circuit upon session initialization. During an actual context switch, a scheduler circuit can identify the session context in the cache by using these parameters and initiate a bulk transfer of these contents to an external low latency memory. In addition, the scheduler circuit can manage the prefetch of the old session if its context was saved to a local memory 608*m*. In particular embodiments, a local memory 608*m* can be low latency memory, such as a reduced latency dynamic random access memory (RLDRAM), as but one very particular embodiment. Thus, in embodiments, session context can be identified distinctly in the cache.

In some embodiments, context size can be limited to ensure fast switching speeds. In addition or alternatively, embodiments can include a bulk transfer mechanism to transfer out session context to a local memory 608*m*. The cache contents stored therein can then be retrieved and prefetched during context switch back to a previous session. Different context session data can be tagged and/or identified within the local memory 608m for fast retrieval. As noted above, context stored by one offload processor may be recalled by a different offload processor.

In the very particular embodiment of FIG. 6-1 multiple offload processing cores can be integrated into a computation FPGA 608. Multiple computational FPGAs can be arbitrated by arbitrator circuits in another FPGA 610. The combination of computational FPGAs (e.g., 608) and arbiter FPGAs (e.g., 610) can be one implementation of a XIMM module. In particular applications, these XIMM modules can provide integrated traffic and thread management circuits that broker execution of multiple sessions on the offload processors.

FIG. 6-2 shows a system flow according to an embodiment. Packet or other I/O data can be received at an I/O device 620. An I/O device 620 can be physical device, virtual device or combination thereof. Interrupts generated from the I/O data, that would conventionally be intended for a host processor 624, can be disabled, allowing such I/O data to be processed without resources of the host processor 624.

An IOMMU 621 can map received data to physical addresses of a system address space. DMA master 625 can transmit such data to such memory addresses by operation of a memory controller 622. Memory controller 622 can execute DRAM transfers over a memory bus with a DMA Slave 627. Upon receiving transferred I/O data, a hardware scheduler 623 can schedule processing of such data with an offload processor 624. In some embodiments, a type of processing can be indicated by metadata within the I/O data. Further, in some embodiments such data can be stored in an Onboard Memory 629. According to instructions from hardware scheduler 623, one or more offload processors 624 can execute computing functions in response to the I/O data. In some embodiments, such computing functions can operate on the I/O data, and such data can be subsequently read out on memory bus via a read request processed by DMA Slave 627.

It should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

It is also understood that the embodiments of the invention may be practiced in the absence of an element and/or step not specifically disclosed. That is, an inventive feature of the invention may be elimination of an element.

Accordingly, while the various aspects of the particular embodiments set forth herein have been described in detail, the present invention could be subject to various changes, substitutions, and alterations without departing from the spirit and scope of the invention.

What is claimed is:

1. A distributed computing architecture for executing at least first and second computing operations executed in parallel on a set of data, the architecture comprising:
   a plurality of servers, including first servers that each include
      at least one central processing unit (CPU), and
      at least one offload processing module coupled to the at least one CPU by a bus, each offload processing module including a plurality of computation elements, the computation elements configured to operate as a virtual switch, and
         execute the second computing operations on first processed data to generate second processed data;
      wherein
   the virtual switches form a switch fabric for exchanging data between the offload processing modules,
   the first computing operations generate the first processed data and are not executed by the offload processing modules, and
   the second computing operations are executed on a plurality of the offload processing modules in parallel.

2. The architecture of claim 1, wherein the computation elements comprise programmable logic devices.

3. The architecture of claim 2, wherein the programmable logic devices comprise field programmable gate array (FPGA) devices.

4. The architecture of claim 1, wherein the offload processing modules comprise first printed circuit boards configured to insert into sockets on second printed circuit boards that include the at least one CPU.

5. The architecture of claim 1, further including:
   the first servers are mounted in a rack structure; and
   a top-of-rack (TOR) switch mounted in the rack structure that provides network connections between servers mounted in the rack structure.

6. The architecture of claim 5, wherein the plurality of servers includes second servers mounted in the rack structure that do not include offload processing modules.

7. The architecture of claim 1, wherein the first and second computing operations are part of a map/reduce algorithm.

8. The architecture of claim 7, wherein:
   the second computing operations are a shuffle operations that generate shuffle results from map results, the shuffle operation being executed by the offload processing modules and not the CPUs of the servers.

9. The architecture of claim 8, wherein:
   the offload processing modules are configured to exchange intermediate (key, value) pairs over the switch fabric.

10. The architecture of claim 7, wherein:
    the servers include second servers that include at least one CPU and do not include offload processing modules; wherein
    the first computing operations include a map operation that generates the map results, the map operation being executed by CPUs in a plurality of the first or second servers and not executed by the offload processing modules; and
    the offload processing modules are configured to receive the map results.

11. The architecture of claim 8, further including:
    the architecture further executes a third computing operation; and
    the third computing operation includes a reduce operation on the shuffle results to generate final map/reduce results, the reduce operation being executed by at least one CPUs in first or second servers; and the offload processing modules are configured to provide the shuffle results to the at least one CPU executing the reduce operation.

12. A method, comprising:

executing first data processing operations on a data set in parallel with a plurality of main central processing units (CPUs) to generate first processing results;

executing second data processing operations on the first processing results in parallel with a plurality of offload processing modules to generate intermediate processing results; and executing third data processing operations on the intermediate processing results with at least one main CPU to generate end processing results; wherein the main CPUs are CPUs in a plurality of servers, and the offload processing modules reside in at least some of the servers, each offload processing module being connected to the CPU of the server via a bus, the offload processing modules each including computation elements formed thereon.

13. The method of claim 12, wherein:

the first data processing operations are map operations of a map/reduce algorithm;

the second data processing operations are shuffle operations of the map/reduce algorithm; and the third data processing operations are reduce operations of the map/reduce algorithm.

14. The method of claim 13, wherein:

executing the second data processing operations includes transmitting data between the offload processing modules over a switch fabric comprising switches formed on the offload processing modules.

15. The method of claim 12, wherein the switches are virtual switches formed by computation elements on the offload processing modules.

16. The method of claim 12, wherein the second data processing operations are executed by the computation elements mounted on the offload processing modules.

17. The method of claim 16, wherein the computation elements comprise programmable logic devices.

18. The method of claim 17, wherein the programmable logic devices comprise field programmable gate array (FPGA) devices.

19. The method of claim 12, further including:

the servers are mounted in at least one rack;

a top-of-rack (TOR) switch mounted in the rack: and transmitting packet data between the servers with the TOR switch.

20. The method of claim 12, wherein each main CPU has greater processing power than one computation element.

* * * * *